United States Patent
Yutani et al.

(10) Patent No.: US 11,237,447 B2
(45) Date of Patent: Feb. 1, 2022

(54) ELECTROCHROMIC ELEMENT

(71) Applicants: Keiichiroh Yutani, Kanagawa (JP); Tomoo Fukuda, Tokyo (JP); Hiroyuki Takahashi, Kanagawa (JP); Koh Fujimura, Tokyo (JP); Tohru Yashiro, Kanagawa (JP); Takaaki Konno, Kanagawa (JP); Noboru Sasa, Kanagawa (JP)

(72) Inventors: Keiichiroh Yutani, Kanagawa (JP); Tomoo Fukuda, Tokyo (JP); Hiroyuki Takahashi, Kanagawa (JP); Koh Fujimura, Tokyo (JP); Tohru Yashiro, Kanagawa (JP); Takaaki Konno, Kanagawa (JP); Noboru Sasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 84 days.

(21) Appl. No.: 16/250,291

(22) Filed: Jan. 17, 2019

(65) Prior Publication Data
US 2019/0227401 A1    Jul. 25, 2019

(30) Foreign Application Priority Data
Jan. 22, 2018 (JP) .............................. JP2018-008398

(51) Int. Cl.
*G02F 1/15* (2019.01)
*G02F 1/153* (2006.01)
(Continued)

(52) U.S. Cl.
CPC .......... *G02F 1/1525* (2013.01); *E06B 3/6722* (2013.01); *E06B 9/24* (2013.01);
(Continued)

(58) Field of Classification Search
CPC .......... G02F 1/0316; G02F 3/16; G02F 1/163; G02F 1/155; G02F 1/1523; G02F 1/1525;
(Continued)

(56) References Cited

U.S. PATENT DOCUMENTS 4,923,289 A * 5/1990 Demiryont ............ G02F 1/1523
359/265
6,301,038 B1 10/2001 Fitzmaurice et al.
(Continued)

FOREIGN PATENT DOCUMENTS

JP   H05-060503   3/1993
JP   H06-045770   2/1994
(Continued)

*Primary Examiner* — Dawayne Pinkney
(74) *Attorney, Agent, or Firm* — IPUSA, PLLC

(57) ABSTRACT

An electrochromic element is provided that includes a first substrate and a second substrate that are arranged to oppose each other, a first transparent electrode that is formed on a surface of the first substrate facing the second substrate, a second transparent electrode that is formed on a surface of the second substrate facing the first substrate, and a coloration layer that is arranged between the first transparent electrode and the second transparent electrode. The coloration layer includes an electrochromic material and an electrolyte, and a pattern or a concentration gradient of the electrochromic material is formed in at least a part of the coloration layer.

16 Claims, 12 Drawing Sheets

(51) Int. Cl.

| | | |
|---|---|---|
| *G09G 3/19* | (2006.01) | |
| *H04N 9/16* | (2006.01) | |
| *G02F 1/1523* | (2019.01) | |
| *G02F 1/1516* | (2019.01) | |
| *G02F 1/1334* | (2006.01) | |
| *G02F 1/155* | (2006.01) | |
| *E06B 9/24* | (2006.01) | |
| *E06B 3/67* | (2006.01) | |
| *G02C 7/10* | (2006.01) | |
| *G03B 7/00* | (2021.01) | |
| *G02F 1/157* | (2006.01) | |

(52) U.S. Cl.
CPC .............. *G02C 7/102* (2013.01); *G02C 7/105* (2013.01); *G02F 1/1334* (2013.01); *G02F 1/153* (2013.01); *G02F 1/155* (2013.01); *G02F 1/1533* (2013.01); *G02F 1/15165* (2019.01); *G03B 7/00* (2013.01); *E06B 2009/2464* (2013.01); *G02F 1/157* (2013.01); *G02F 2001/164* (2019.01)

(58) Field of Classification Search
CPC ........ G02F 1/1521; G02F 1/1533; G02F 1/03; C09K 9/02; B60R 1/088; H04N 9/3137; H04N 9/22
USPC ........... 359/265–277, 245–247, 242; 345/49, 345/105; 250/70; 348/817; 438/929
See application file for complete search history.

(56) References Cited

U.S. PATENT DOCUMENTS

| | | | |
|---|---|---|---|
| 8,373,919 B2 | 2/2013 | Foller et al. | |
| 8,531,754 B2 | 9/2013 | Fujimura et al. | |
| 9,304,368 B2 | 4/2016 | Yashiro et al. | |
| 9,891,497 B2 | 2/2018 | Yashiro et al. | |
| 9,933,682 B2 | 4/2018 | Greer | |
| 10,088,730 B2 | 10/2018 | Kumai et al. | |
| 10,114,266 B2 | 10/2018 | Kumar et al. | |
| 10,126,623 B2 | 11/2018 | Goto et al. | |
| 10,301,871 B2 * | 5/2019 | Shrivastava | G02F 1/153 |
| 2003/0227664 A1 | 12/2003 | Agrawal et al. | |
| 2012/0050838 A1 | 3/2012 | Hirano et al. | |
| 2012/0069420 A1 * | 3/2012 | Suzuki | G02F 1/153 359/270 |
| 2014/0078569 A1 * | 3/2014 | Takahashi | G09G 3/38 359/266 |
| 2015/0168796 A1 | 6/2015 | Yashiro et al. | |
| 2015/0362817 A1 * | 12/2015 | Patterson | G02F 1/161 359/275 |
| 2016/0313537 A1 | 10/2016 | Mercado | |
| 2017/0010514 A1 * | 1/2017 | Yashiro | G02F 1/1508 |
| 2017/0219901 A1 * | 8/2017 | Kumai | G02F 1/157 |
| 2017/0235203 A1 | 8/2017 | Yamamoto et al. | |
| 2017/0329197 A1 | 11/2017 | Yashiro et al. | |
| 2017/0329198 A1 | 11/2017 | Matsuoka et al. | |
| 2017/0329199 A1 | 11/2017 | Yashiro et al. | |
| 2018/0044581 A1 | 2/2018 | Sagisaka et al. | |
| 2018/0208834 A1 | 7/2018 | Goto et al. | |

FOREIGN PATENT DOCUMENTS

| | | |
|---|---|---|
| JP | H06-300992 | 10/1994 |
| JP | 2007-171781 | 7/2007 |
| JP | 3955641 | 8/2007 |
| JP | 2008-116718 | 5/2008 |
| JP | 2010-033016 | 2/2010 |
| JP | 5554343 | 7/2014 |
| JP | 2017-509031 | 3/2017 |
| JP | 2017-526949 | 9/2017 |
| WO | 2010/065713 | 6/2010 |
| WO | 2015/187226 | 12/2015 |
| WO | 2016/063849 | 4/2016 |

* cited by examiner

40A

20

40B

20

ELECTROCHROMIC ELEMENT

CROSS-REFERENCE TO RELATED APPLICATIONS

The present application is based on and claims priority to Japanese Patent Application No. 2018-008398 filed on Jan. 22, 2018, the entire contents of which are incorporated herein by reference.

BACKGROUND OF THE INVENTION

1. Field of the Invention

The present invention relates to an electrochromic element, a lens unit, an image capturing apparatus, electronic dimming eyeglasses, and an electronic dimming window.

2. Description of the Related Art

Optical filters are capable of improving the image capturing quality of image capturing apparatuses and are therefore being widely used and developed. However, a lens unit including an optical filter has to be replaced according to the purpose.

In this respect, electro-optic filters that are capable of switching between a transparent state and a state having a predetermined light transmittance in response to an electric signal are being developed. In this way, two functions may be implemented with one lens, and replacement of the lens may become unnecessary.

For example, International Publication No. WO/2015/187226 describes an electroactive optical device that includes an optical substrate having two opposing surfaces; at least two electrodes spaced one from the other and disposed on the surface of the substrate; and at least one electroactive material layer in contact with the at least two electrodes and the surface of the substrate. The electroactive optical device has variable light transmittance in response to the magnitude of an applied electrical voltage.

Also, for example, International Publication No. WO/2010/065713 describes optical element with an electrochromic apodized aperture having variable light transmittance in response to the amplitude of an applied voltage.

However, the above-described electro-optical filters do not take into consideration the formation of a pattern or a concentration gradient of an electrochromic material.

Another promising application of the optical filter includes its use as an electronic dimming eyeglass lens.

Tinted lenses used in conventional sunglasses that have been developed to protect eyes from ultraviolet rays contained in sunlight and reduce glare to improve visibility are widespread. Some tinted lenses have gradation patterns of a predetermined light transmittance formed therein, and in recent years, their applications have expanded to various fields including sports, medicine, fashion, and the like.

However, because tinted lenses have lower light transmittance as compared with clear lenses, their visibility deteriorates in dark places.

In this respect, electronic dimming eyeglass lenses using electrochromic materials have been developed as lenses that have lower light transmittance by becoming tinted in bright places and have higher light transmittance by becoming clear in dark places (see e.g., Japanese Unexamined Patent Publication No. H06-300992).

However, these electronic dimming eyeglass lenses do not take into consideration the formation of a pattern or a concentration gradient of the electrochromic material.

Another promising application of the optical filter includes its use as an electronic dimming window. Because external light changes in response to environmental changes, indoor comfort in buildings and vehicles such as airplanes, automobiles and the like may be improved by using electronic dimming windows.

However, these electronic dimming windows do not take into consideration the formation of a pattern or a concentration gradient of the electrochromic material.

As described above, conventional electrochromic elements do not have a pattern or a concentration gradient of an electrochromic material formed therein such that they cannot form a light transmittance distribution upon coloration.

SUMMARY OF THE INVENTION

An aspect of the present invention is directed to providing an electrochromic element that is capable of forming a light transmittance distribution upon coloration.

According to one embodiment of the present invention, an electrochromic element is provided that includes a first substrate and a second substrate that are arranged to oppose each other, a first transparent electrode that is formed on a surface of the first substrate facing the second substrate, a second transparent electrode that is formed on a surface of the second substrate facing the first substrate, and a coloration layer that is arranged between the first transparent electrode and the second transparent electrode. The coloration layer includes an electrochromic material and an electrolyte, and a pattern or a concentration gradient of the electrochromic material is formed in at least a part of the coloration layer.

DESCRIPTION OF THE EMBODIMENTS

In the following, embodiments of the present invention will be described with reference to the accompanying drawings. Note, however, that the present invention is not limited to the embodiments and examples described below and various modifications and changes may be made within the scope of the present invention.

Electrochromic Element

Figure 1:
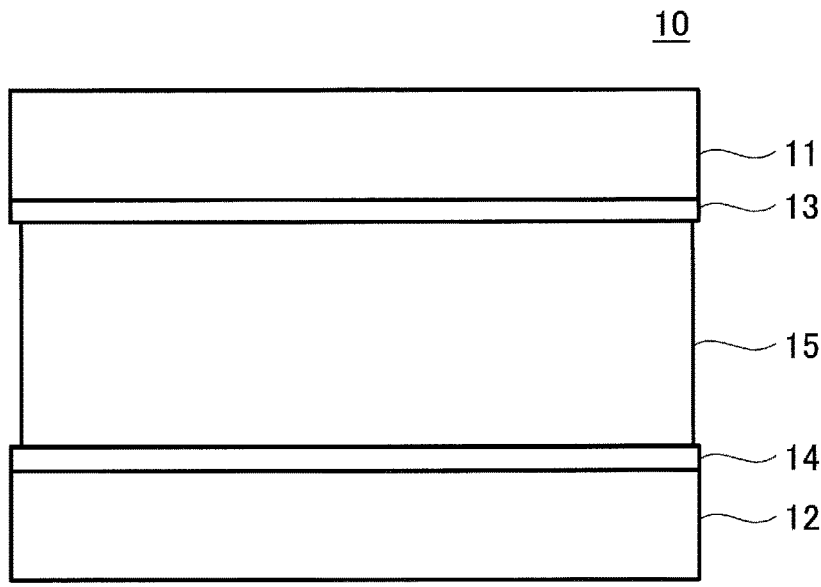
FIG. 1 is a cross-sectional view of an electrochromic element according to a first embodiment of the present invention.

FIG. 1 illustrates an electrochromic element 10 according to a first embodiment of the present invention.

The electrochromic element 10 includes a first substrate 11 and a second substrate 12 that are arranged to face each other. Also, the electrochromic element 10 includes a first transparent electrode 13 that is continuously formed on the surface of the first substrate 11 facing the second substrate 12 (i.e., inner surface of the first substrate 11). Further, the electrochromic element 10 includes a second transparent electrode 14 that is continuously formed on the surface of the second substrate 12 facing the first substrate 11 (i.e., inner surface of the second substrate 12). Also, the electrochromic element 10 includes a coloration layer 15 that is arranged between the first transparent electrode 13 and the second transparent electrode 14. The coloration layer 15 includes an electrochromic material and an electrolyte. Further, a pattern or a concentration gradient of the electrochromic material is formed in at least a part of the coloration layer 15 in a direction parallel to the surface of the first substrate 11 (or the second substrate 12). Thus, by applying a predetermined coloration voltage between the first transparent electrode 13 and the second transparent electrode 14, the electrochromic material contained in the coloration layer 15 is oxidized and/or reduced to cause coloration of the coloration layer 15. Because a pattern or a concentration gradient of the electrochromic material is formed in the direction parallel to the surface of the first substrate 11 (or the second substrate 12) in the coloration layer 15, a light transmittance distribution can be formed in the coloration layer 14 at the time of coloration.

Figure 2:
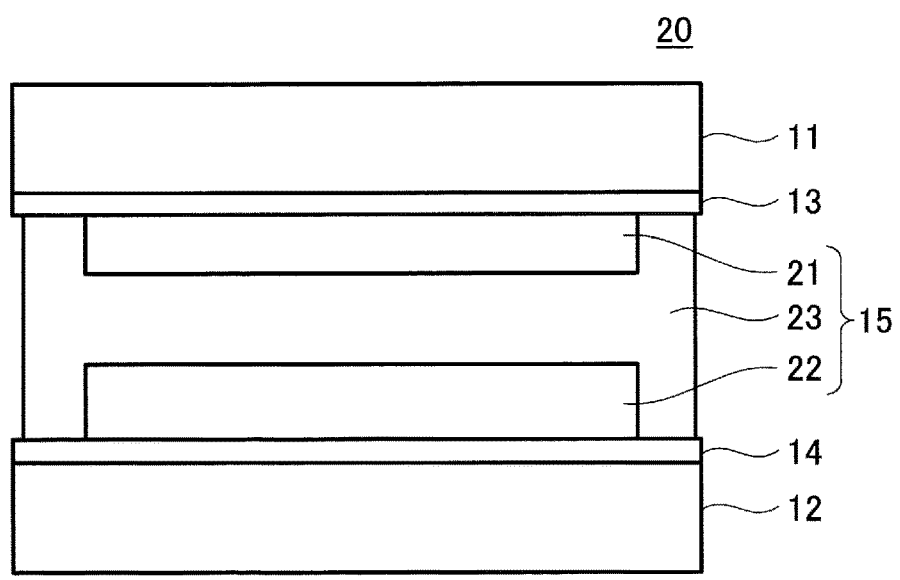
FIG. 2 is a cross-sectional view of an electrochromic element according to a second embodiment of the present invention.

FIG. 2 illustrates an electrochromic element 20 according to a second embodiment of the present invention.

The electrochromic element 20 has a configuration similar to that of the electrochromic element 10 except that the coloration layer 15 of the electrochromic element 20 includes an oxidizing electrochromic layer 21 that is in contact with the first transparent electrode 13, a reducing electrochromic layer 22 that is in contact with the second transparent electrode 14, and an electrolyte layer 23 containing an electrolyte. Note that the oxidizing electrochromic layer 21 and the reducing electrochromic layer 22 respectively include an oxidizing electrochromic material and a reducing electrochromic material. In the electrochromic element 20, charges supplied from the first transparent electrode 13 and the second transparent electrode 14 are respectively held in the oxidizing electrochromic layer 21 and the reducing electrochromic layer 22 during the coloration operation. Thus, once the electrochromic element 20 is in a colored state, almost no electric power is required to maintain the colored state, and as a result, a device with low power consumption can be manufactured.

Note that a pattern or a concentration gradient of the oxidizing electrochromic material is formed in at least a part of the oxidizing electrochromic layer 21. Also, a pattern or a concentration gradient of the reducing electrochromic material is formed in at least a part of the reducing electrochromic layer 22. In this way, the electrochromic element 20 can form a light transmittance distribution at the time of coloration.

Pattern or Concentration Gradient of Electrochromic Material

In the following, example patterns or concentration gradients of the electrochromic materials in the oxidizing electrochromic layer 21 and the reducing electrochromic layer 22 of the electrochromic element 20 will be described.

Note that specific examples of a pattern or a concentration gradient of an optical filter applied to a lens unit incorporated in an image capturing apparatus will be described below. However, a pattern or a concentration gradient formed in the electrochromic element according to the present embodiment is not limited to a pattern or a concentration gradient of an optical filter applied to a lens unit incorporated in an image capturing apparatus.

Figure 3A:
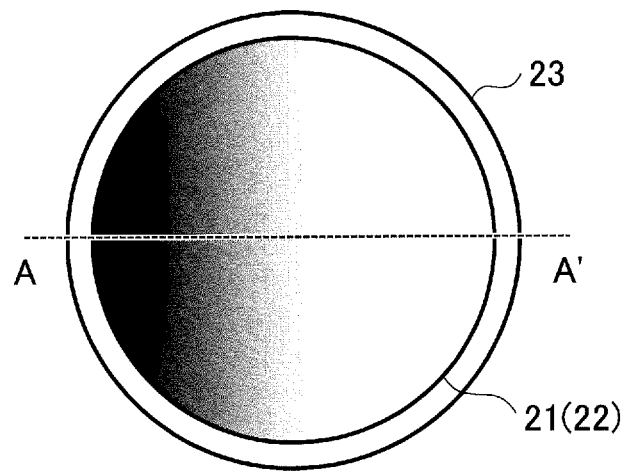
FIGS. 3A and 3B are diagrams illustrating example concentration gradients of an electrochromic material in an oxidizing electrochromic layer and a reducing electrochromic layer of the electrochromic element of FIG. 2.
Figure 3B:
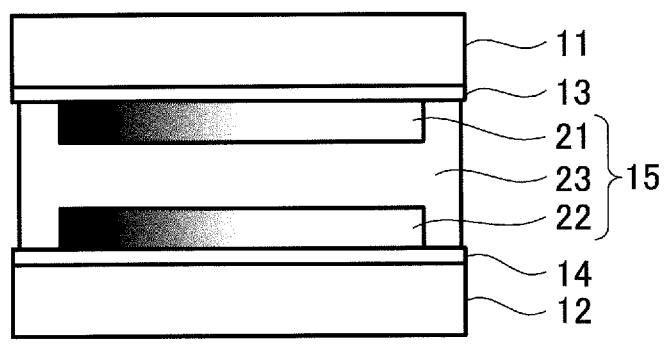

FIGS. 3A and 3B illustrate an example halftone filter as an example concentration gradient of the electrochromic material formed in the oxidizing electrochromic layer 21 and the reducing electrochromic layer 22. The halftone filter is a filter having a light transmittance that changes in one axis direction. FIG. 3A represents a top view or a bottom view of the coloration layer 15, and FIG. 3B is a cross-sectional view of the electrochromic element 20 across line A-A' of FIG. 3A.

In the oxidizing electrochromic layer 21 and the reducing electrochromic layer 22, the electrochromic material (black portion in FIGS. 3A and 3B) is distributed to form a concentration distribution along one axis direction in a direction parallel to the surface of the first substrate 11 (or the surface of the second substrate 12). Specifically, the halftone filter has a concentration distribution region arranged such that half the region toward one end A' of the one axis direction has a low concentration of the electrochromic material and the other half of the region toward the other end A of the one axis direction has a high concentration of the electrochromic material. Note that in the halftone filter of FIGS. 3A and 3B, the concentration of the electrochromic material is uniform in half the region of the halftone filter toward the one end A' of the one axis direction, and a concentration gradient of the electrochromic material is formed in the other half region of the halftone filter toward the other end A of the one axis direction.

Figure 4A:
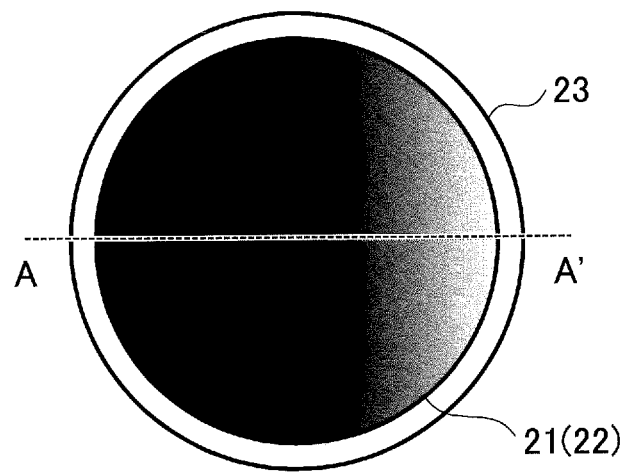
FIGS. 4A and 4B are diagrams illustrating other example concentration gradients of the electrochromic material in the oxidizing electrochromic layer and the reducing electrochromic layer of FIG. 2.
Figure 4B:
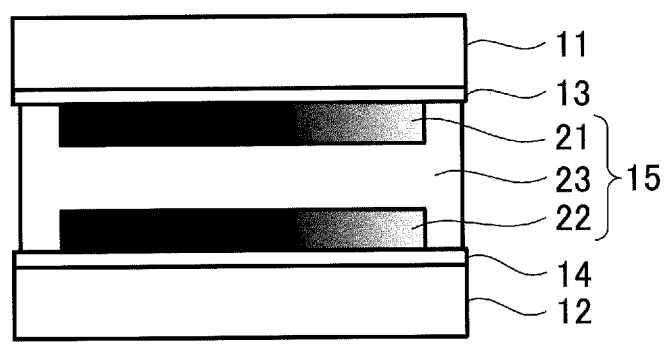

Note that in another example of a halftone filter as illustrated in FIGS. 4A and 4B, the concentration of the electrochromic material may be uniform in the half region toward the other end A of the one axis direction, and a concentration gradient of the electrochromic material may be formed in the other half region toward the one end A' of the one axis direction.

Further, note that the proportion of the region of the halftone filter where the concentration gradient of the electrochromic material is formed is not limited to ½ as in the examples of FIGS. 3A-4B, and the proportion may be set to some other value such as ¼, for example. The halftone filters as described can be used to adjust the amount of light in an image capturing area, for example.

Figure 5A:
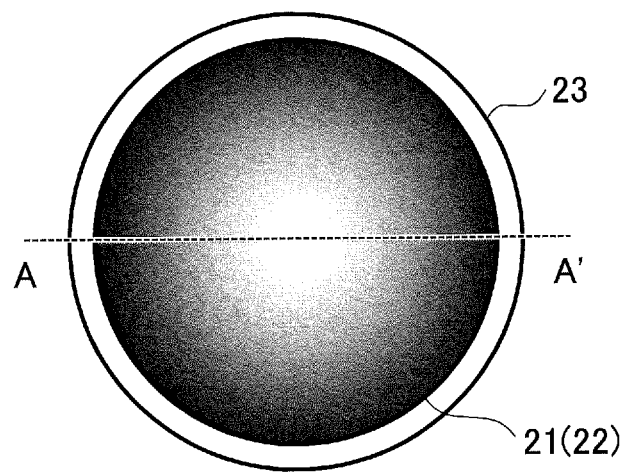
FIGS. 5A and 5B are diagrams illustrating other example concentration gradients of the electrochromic material in the oxidizing electrochromic layer and the reducing electrochromic layer of FIG. 2.
Figure 5B:
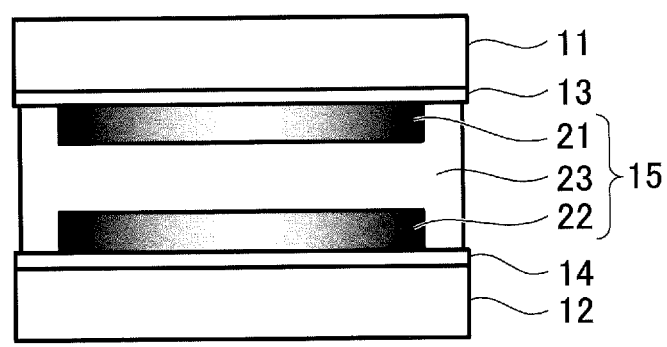

FIGS. 5A and 5B illustrate an apodization filter as another example of the concentration gradient of the electrochromic material in the oxidizing electrochromic layer 21 and the reducing electrochromic layer 22. The apodization filter is a filter that has high light transmittance at the center and gradually decreasing light transmittance from the center toward the periphery. FIG. 5A represents a top view or a bottom view of the coloration layer 15, and FIG. 5B is a cross-sectional view of the electrochromic element 20 across line A-A' of FIG. 5A.

In the oxidizing electrochromic layer 21 and the reducing electrochromic layer 22, the electrochromic material (black portion in FIGS. 5A and 5B) is distributed such that a concentrically uniform concentration gradient of the electrochromic material is formed. Specifically, the apodization filter has a distribution in which the concentration of the electrochromic material is 0 at the center and the concentration of the electrochromic material increases from the center toward the periphery. That is, the closer a region of the apodization filter is to the periphery, the lower the light transmittance at the time of coloration. The apodization filter may be used to adjust the depth of field.

Figure 6A:
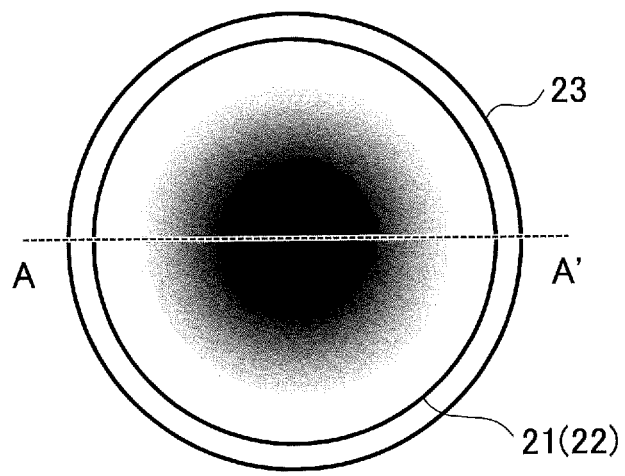
FIGS. 6A and 6B are diagrams illustrating other example concentration gradients of the electrochromic material in the oxidizing electrochromic layer and the reducing electrochromic layer of FIG. 2.
Figure 6B:
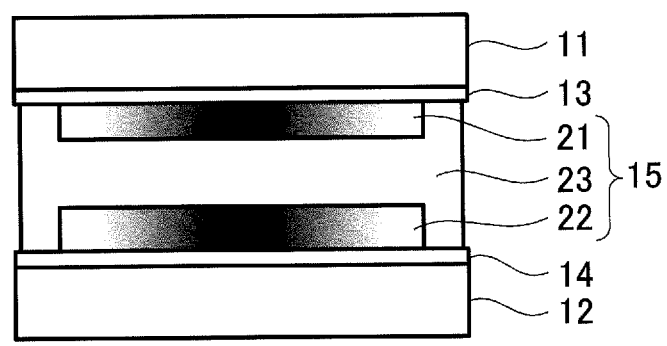

FIGS. 6A and 6B illustrate a super resolution filter as another example of the concentration gradient of the electrochromic material in the oxidizing electrochromic layer 21 and the reducing electrochromic layer 22. The super resolution filter is a filter having low light transmittance at the center and gradually increasing light transmittance from the center toward the periphery. FIG. 6A represents a top view or a bottom view of the coloration layer 15, and FIG. 6B is a cross-sectional view of the electrochromic element 20 across line A-A' of FIG. 6A.

In the oxidizing electrochromic layer 21 and the reducing electrochromic layer 22, the electrochromic material (black portion in FIGS. 6A and 6B) is distributed such that a concentrically uniform concentration gradient of the electrochromic material is formed. Specifically, in contrast to FIGS. 5A and 5B, the super resolution filter has a distribution in which the concentration of the electrochromic material is the highest at the center and the concentration of the electrochromic material decreases from the center toward the periphery. Thus, the closer a region of the super resolution filter is to the center, the lower the light transmittance at the time of coloration. The super resolution filter may be used to adjust the resolution.

Figure 7:
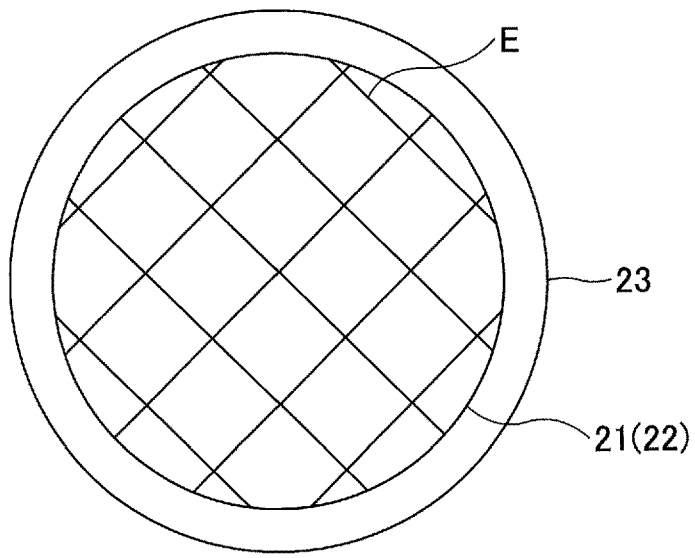
FIG. 7 is a top view of an example pattern of the electrochromic material formed in the oxidizing electrochromic layer and the reducing electrochromic layer of FIG. 2.
Figure 8:
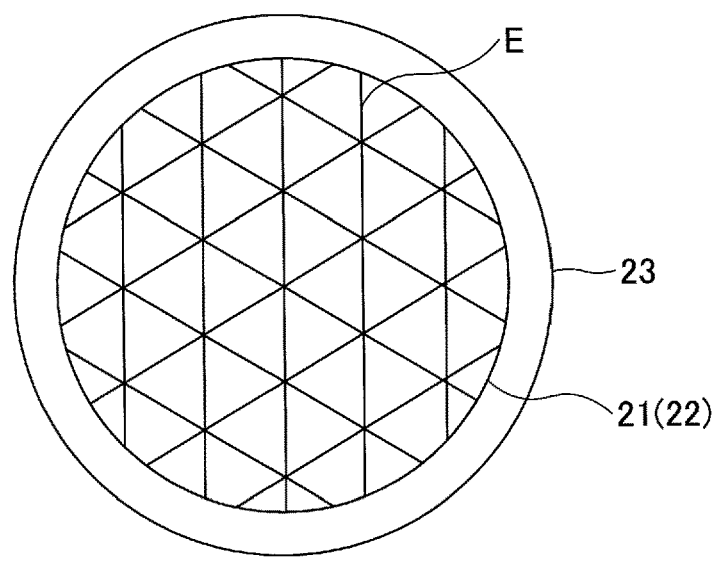
FIG. 8 is a top view of another example pattern of the electrochromic material formed in the oxidizing electrochromic layer and the reducing electrochromic layer of FIG. 2.
Figure 9:
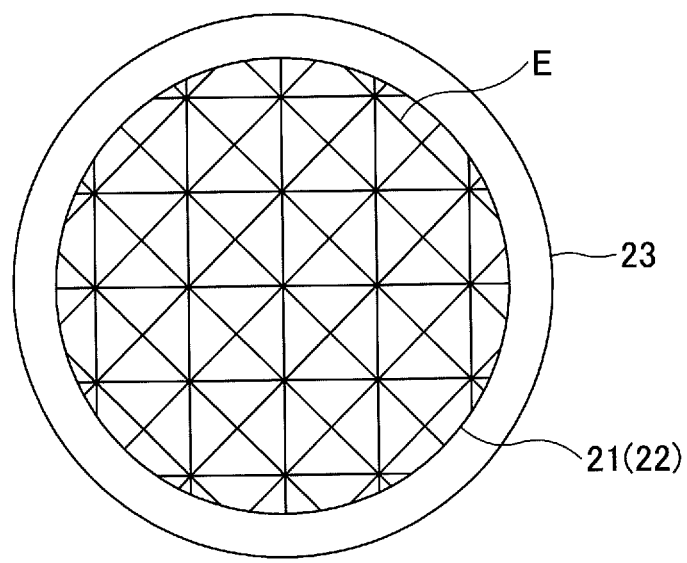
FIG. 9 is a top view of another example pattern of the electrochromic material formed in the oxidizing electrochromic layer and the reducing electrochromic layer of FIG. 2.

FIGS. 7 to 9 illustrate examples of a cross filter as specific examples of patterns of the electrochromic material formed in the oxidizing electrochromic layer 21 and the reducing electrochromic layer 22. The cross filter is a filter that creates "light lines" to emphasize illumination and the like.

In FIGS. 7 to 9, an electrochromic material E is patterned over the entire surfaces of the oxidizing electrochromic layer 21 and the reducing electrochromic layer 22. In this way, cross effects can be created for all bright sources derived from the oxidizing electrochromic layer 21 and the reducing electrochromic layer 22.

Note that in other examples, the pattern of the electrochromic material E may be formed in partial regions (e.g., ¼ regions) of the surfaces of the oxidizing electrochromic layer 21 and the reducing electrochromic layer 22 to form a partial cross filter, for example. In the partial cross filter, cross effects are created only for bright sources derived from the regions where the electrochromic material E is patterned, from among the bright sources derived from the oxidizing electrochromic layer 21 and the reducing electrochromic layer 22.

Note that the region where the pattern of the electrochromic material E is to be formed and the pattern of the electrochromic material E can be set up as desired.

By implementing any of the above examples of FIGS. 3A to 9, the electrochromic element 20 can be an optical filter having a special function by applying a predetermined coloration voltage between the first transparent electrode 13 and the second transparent electrode 14 to cause coloration of the oxidizing electrochromic layer 21 and the reducing electrochromic layer 22. Also, by applying a predetermined decoloration voltage between the first transparent electrode 13 and the second transparent electrode 14 to cause decoloration of the oxidizing electrochromic layer 21 and the reducing electrochromic layer 22, the electrochromic element 20 can be returned to a transparent state. In this way, the electrochromic element 20 may be electrically switched between a transparent state and a state having a light transmittance distribution formed therein.

Figure 10:
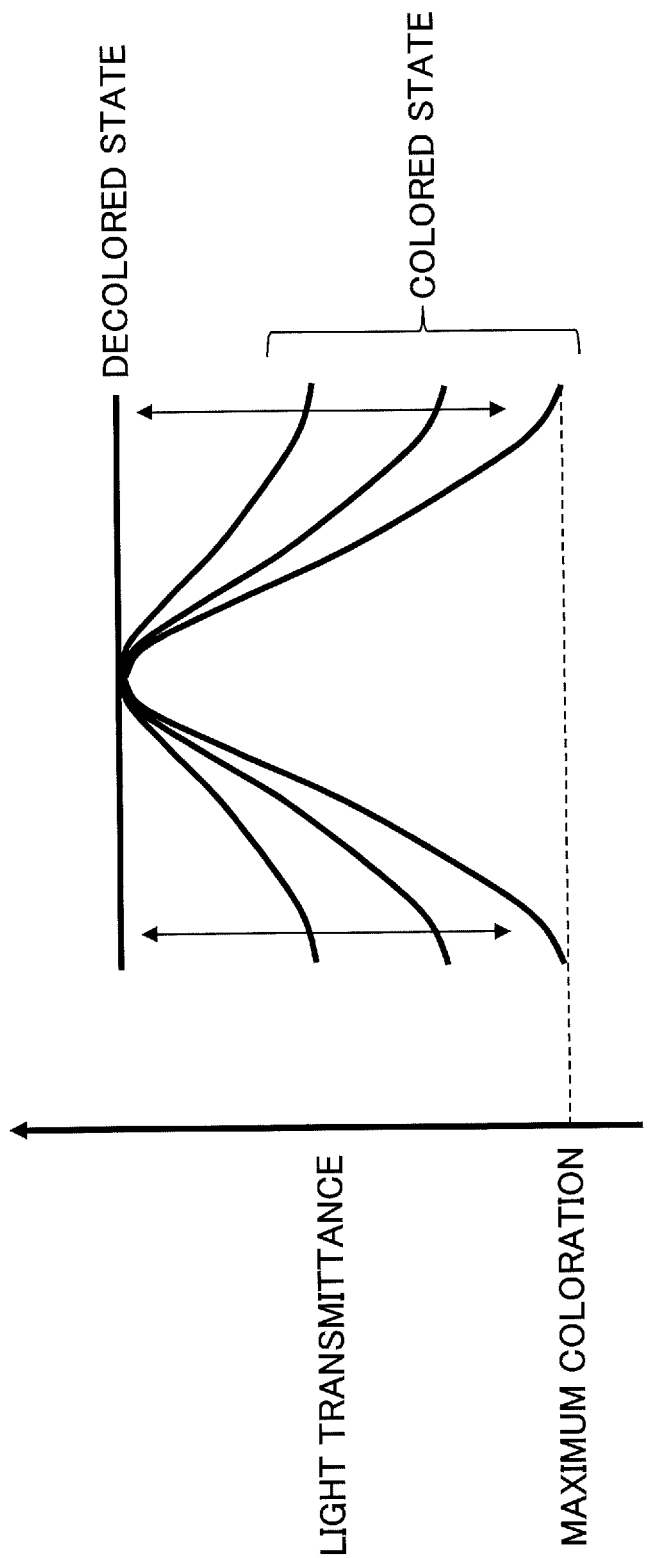
FIG. 10 is a graph indicating the light transmittance of the oxidizing electrochromic layer and the reducing electrochromic layer of FIG. 5.

Also, for example, with respect to the oxidizing electrochromic layer 21 and the reducing electrochromic layer 22 of FIG. 5, the light transmittance of the oxidizing electrochromic layer 21 and the reducing electrochromic layer 22 may be variably set between minimum coloration (decolored state) and maximum coloration depending on the time for which a predetermined coloration voltage is applied between the first transparent electrode 13 and the second transparent electrode 14 (see FIG. 10). That is, the effect achieved by using multiple conventional optical filters with fixed light transmittance can be obtained by a single electrochromic element 20. In this way, replacement of the optical filter may become unnecessary such that convenience may be improved as compared with the case of using multiple conventional optical filters. Also, because the optical filter does not have to be mechanically replaced, device miniaturization and elimination of vibration may be achieved.

Note that although examples of a pattern or a concentration gradient of the electrochromic material are described above with reference to the case of using the electrochromic element 20, the same applies to the case of using the electrochromic element 10.

Method of Forming Pattern or Concentration Gradient of Electrochromic Material

A method of forming a pattern or a concentration gradient of the electrochromic material is not particularly limited, but examples include a method that involves forming the electrochromic material on an entire surface and removing unnecessary portions, and a method that involves selectively forming the electrochromic material only on desired portions.

Also, film forming methods that may be used to form the electrochromic material include a dry method that involves sublimation by heating the electrochromic material under vacuum or the like to form a film, and a wet method that involves depositing an ink having the electrochromic material dissolved or dispersed in a solvent using a printing technique to form a film.

Examples of the dry method that may be used include vacuum vapor deposition, sputtering, ion plating, and the like.

Examples of the wet method that may be used include spin coating, casting, micro gravure coating, gravure coating, bar coating, roll coating, wire bar coating, dip coating, slit coating, capillary coating, spray coating, nozzle coating, gravure printing, screen printing, flexographic printing, offset printing, reverse printing, inkjet printing, and the like.

Also, when forming a concentration gradient of the electrochromic material, an area gradation method or a density gradation method may be used.

The area gradation method involves adjusting an area of the electrochromic material within a predetermined area using an algorithm such as dithering.

On the other hand, the density gradation method involves adjusting the concentration of the electrochromic material or the thickness of the electrochromic layer.

Note that the above-described methods may be used to form a pattern or a concentration gradient of only the electrochromic material, or a pattern or a concentration gradient of a mixture of the electrochromic material and the electrolyte mixed at a predetermined ratio.

Electrochromic Element Components

In the following, the components of the electrochromic element 20 will be described.

First Substrate, Second Substrate

The first substrate 11 has the function of supporting the first transparent electrode 13, and the second substrate 12 has the function of supporting the second transparent electrode 14. The first transparent electrode 13 and the second transparent electrode 14 have the function of holding the coloration layer 15 that is interposed between these two electrodes.

Note that any known organic material or inorganic material can be used as the material of the first substrate 11 and the second substrate 12 as long as the material is transparent and is capable of supporting the first transparent electrode 13 and the second transparent electrode 14.

For example, a glass substrate, a resin substrate, a resin film, or the like can be used as the first substrate 11 and the second substrate 12. By using a resin film as the first substrate 11 and the second substrate 12, a thin, lightweight and flexible electrochromic module may be obtained.

The material constituting the glass substrate may be, for example, non-alkali glass, borosilicate glass, float glass, soda lime glass, and the like.

The material constituting the resin substrate or the resin film may be, for example, polycarbonate, acrylic resin, polyethylene, polyvinyl chloride, polyester, epoxy resin, melamine resin, phenol resin, polyurethane, polyimide, and the like.

Note that the first substrate 11 and the second substrate 12 may be coated with a transparent insulating layer, a UV-protective layer, an antireflection layer, or the like in order to improve water vapor barrier properties, gas barrier properties, ultraviolet resistance, and visibility, for example.

The shapes of the first substrate 11 and the second substrate 12 are not particularly limited and may be suitably selected according to the purpose. For example, the first substrate 11 and the second substrate 12 may have a rectangular shape, a round shape, and the like.

The first substrate 11 and the second substrate 12 may be formed by a plurality of substrates one stacked over another. For example, a substrate structure having two glass substrates stacked one over the other with an electrochromic module held between the glass substrates may be used as the first substrate 11 and the second substrate 12 to improve water vapor barrier properties and gas barrier properties.

First Transparent Electrode, Second Transparent Electrode

The material constituting the first transparent electrode 13 and the second transparent electrode 14 is not particularly limited as long as the material is a conductive transparent material, and a suitable material may be selected according to the purpose. For example, tin-doped indium oxide (hereinafter also referred to as "ITO"), fluorine-doped tin oxide (hereinafter also referred to as "FTO"), antimony-doped tin oxide (hereinafter also referred to as "ATO"), zinc oxide, and the like may be used.

Also, the first transparent electrode 13 and the second transparent electrode 14 may be made of highly transparent materials such as carbon nanotubes, or highly conductive non-transmitting materials such as Au, Ag, Pt, and Cu that are formed into fine networks to be used as electrodes that have improved conductivity while maintaining transparency.

The thickness of each of the first transparent electrode 13 and the second transparent electrode 14 can be suitably adjusted so that a required electric resistance for oxidation-reduction reaction of the electrochromic material in the coloration layer 15 can be obtained.

For example, in the case of using ITO as the material constituting the first transparent electrode 13 and the second transparent electrode 14, the average thickness of each of the first transparent electrode 13 and the second transparent electrode 14 is preferably in the range from about 50 nm to about 500 nm.

The example methods that can be used to form the first transparent electrode 13 and the second transparent electrode 14 include vacuum vapor deposition, sputtering, ion plating, and the like.

In the case where the material constituting the first transparent electrode 13 and the second transparent electrode 14 can be applied, the methods that can be used to form the first transparent electrode 13 and the second transparent electrode 14 include various coating methods and printing methods such as spin coating, casting, micro gravure coating, gravure coating, bar coating, roll coating, wire bar coating, dip coating, slit coating, capillary coating method, a spray coating method, a nozzle coating, gravure printing, screen printing, flexographic printing, offset printing, reverse printing, inkjet printing, and the like.

Oxidizing Electrochromic Layer

The average thickness of the oxidizing electrochromic layer 21 is preferably greater than or equal to 0.1 µm and less than or equal to 30 µm, and more preferably greater than or equal to 0.4 µm and less than or equal to 10 µm. When the average thickness of the oxidizing electrochromic layer 21 is greater than or equal to 0.1 µm, the optical density at the time of coloration can be improved. When the average thickness of the oxidizing electrochromic layer 21 is less than or equal to 30 μm, uniformity and surface smoothness of the oxidizing electrochromic layer 21 can be improved.

Note that the oxidizing electrochromic layer 21 may be a laminate of two or more layers, for example.

Also, the oxidizing electrochromic layer 21 may be formed on a part of the first transparent electrode 13, for example.

Also, in view of achieving desired solvent resistance and durability, the oxidizing electrochromic layer 21 preferably contains a crosslinked product of an oxidizing electrochromic composition including a radical polymerizable compound having a triarylamine structure and another radical polymerizable compound.

The oxidizing electrochromic composition includes a radical polymerizable compound having a triarylamine structure and another radical polymerizable compound, and preferably further includes a polymerization initiator, and may further include other components as necessary.

Radical Polymerizable Compound having Triarylamine Structure

The radical polymerizable compound having a triarylamine structure is required for imparting the oxidizing electrochromic layer 21 with an electrochromic function of undergoing oxidation-reduction reaction on the surface of the first transparent electrode 13.

The radical polymerizable compound having a triarylamine structure includes a compound represented by the following general formula (1), for example.

$$(A)_n-(B)_m \qquad (1)$$

Note that in the above general formula (1), "n" is equal to 1 or 2, and when "n" is equal to 2, "m" is equal to 0, and when "n" is equal to 1, "m" is equal to 0 or 1.

Further, "A" is a structure represented by the following general formula (2). When n=m=1, "A" forms a bond with "B" at any position from among $R_1$ to $R_{15}$. When n=2 and m=0, "A" forms a bond with "A" at any position from among $R_1$ to $R_{15}$. When n=1 and m=0, the radical polymerizable compound having a triarylamine structure is "A".

Further, "B" is a structure represented by the following general formula (3). "B" forms a bond with "A" at any position from among $R_{16}$ to $R_{21}$.

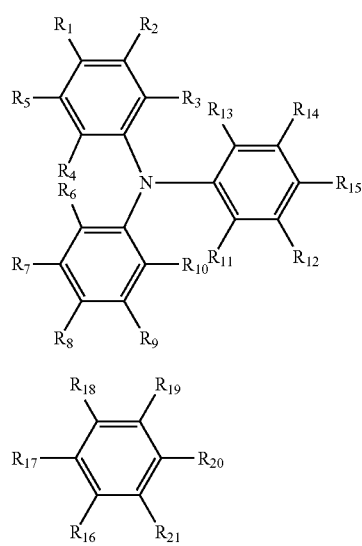

Note that in the above general formulas (2) and (3), $R_1$ to $R_{21}$ each represent monovalent organic groups, which may be the same or different, and at least one of $R_1$ to $R_{21}$ is a radical polymerizable group.

The monovalent organic group is not particularly limited, but examples include a hydrogen atom, a halogen atom, a hydroxyl group, a nitro group, a cyano group, a carboxyl group, an alkoxycarbonyl group that may have a substituent, an aryloxycarbonyl group that may have a substituent, an alkylcarbonyl group that may have a substituent, an arylcarbonyl group that may have a substituent, an amide group (—$CONH_2$), a monoalkylaminocarbonyl group that may have a substituent, a dialkylaminocarbonyl group that may have a substituent, a monoarylaminocarbonyl group that may have a substituent, a diarylaminocarbonyl group that may have a substituent, a sulfonate group, an alkoxysulfonyl group that may have a substituent, an aryloxy sulfonyl group that may have a substituent, an alkylsulfonyl group that may have a substituent, an arylsulfonyl group that may have a substituent, a sulfonamide group (—$SO_2NH_2$), a monoalkylaminosulfonyl group that may have a substituent, a dialkylaminosulfonyl group that may have a substituent, a monoarylaminosulfonyl group that may have a substituent, a diarylaminosulfonyl group that may have a substituent, an amino group, a monoalkylamino group that may have a substituent, a dialkylamino group that may have a substituent, an alkyl group that may have a substituent, an alkenyl group that may have a substituent, an alkynyl group that may have a substituent, an aryl group that may have a substituent, an alkoxy group that may have a substituent, an aryloxy group that may have a substituent, an alkylthio group that may have a substituent, an arylthio group that may have a substituent, and a heterocyclic group that may have a substituent. Among the above examples, an alkyl group, an alkoxy group, a hydrogen atom, an aryl group, an aryloxy group, a halogen atom, an alkenyl group, and an alkynyl group are particularly suitable in view of achieving desired operational stability and durability of the electrochromic elements 10 and 20.

Examples of the halogen atom include a fluorine atom, a chlorine atom, a bromine atom, an iodine atom, and the like.

Examples of the alkyl group include a methyl group, an ethyl group, a propyl group, a butyl group, and the like.

Examples of the aryl group include a phenyl group and a naphthyl group.

Examples of the alkoxy group include a methoxy group, an ethoxy group, a propoxy group, and the like.

Examples of the aryloxy group include a phenoxy group, a 1-naphthyloxy group, a 2-naphthyloxy group, a 4-methoxyphenoxy group, a 4-methylphenoxy group, and the like.

Examples of the heterocyclic group include carbazole, dibenzofuran, dibenzothiophene, oxadiazole, and thiadiazole in which one hydrogen atom is removed.

Examples of the substituent include a halogen atom, a nitro group, a cyano group, an alkyl group such as a methyl group and an ethyl group, an alkoxy group such as a methoxy group and an ethoxy group, an aryloxy group such as a phenoxy group, an aryl group such as a phenyl group and a naphthyl group, an aralkyl group such as a benzyl group and a phenethyl group, and the like.

The radical polymerizable group is not particularly limited as long as it has a carbon-carbon double bond and is capable of radical polymerization.

Examples of the radical polymerizable group include groups represented by the following general formula (4) and groups represented by the following general formula (5).

$$CH_2=CH-X- \qquad \ldots (4)$$

Note that in the above general formula (4), $X_1$ represents a single bond, an arylene group that may have a substituent, an alkenylene group that may have a substituent, —CO—, —COO—, —CONR$_{100}$— (where $R_{100}$ represents a hydrogen atom, an alkyl group, an aralkyl group, or an aryl group), or —S—.

CH$_2$=C(Y)—X$_2$—  ... (5)

Note that in the above general formula (5), Y represents an alkyl group that may have a substituent, an aralkyl group that may have a substituent, an aryl group that may have a substituent, a halogen atom, a cyano group, a nitro group, an alkoxy group, —COOR$_{101}$ [where $R_{101}$ represents a hydrogen atom, an alkyl group that may have a substituent, an aralkyl group that may have a substituent, an aryl group that may have a substituent, CONR$_{102}$R$_{103}$ (where each of $R_{102}$ and $R_{103}$ independently represent a hydrogen atom, an alkyl group that may have a substituent, an aralkyl group that may have a substituent, or an aryl group that may have a substituent)]. Also, $X_2$ represents any of the above possible options for $X_1$ in the general formula (4) or an alkylene group. Note, however, that at least one of Y and $X_2$ is an oxycarbonyl group, a cyano group, an alkenylene group, or an aromatic hydrocarbon group.

Examples of the arylene group in the general formula (4) include a phenylene group that may have a substituent, a naphthylene group, and the like.

Examples of the alkenylene group in the general formula (4) include an ethenylene group, a propenylene group, a butenylene group, and the like.

Examples of the alkyl group in the general formula (4) include a methyl group, an ethyl group, and the like.

Examples of the aralkyl group in the general formula (4) include a benzyl group, a naphthylmethyl group, a phenethyl group, and the like.

Examples of the aryl group in the general formula (4) include a phenyl group, a naphthyl group, and the like.

Specific examples of the group represented by the general formula (4) include a vinyl group, a styryl group, a 2-methyl-1,3-butadienyl group, a vinylcarbonyl group, an acryloyl group, an acryloyloxy group, an acryloylamide group (CH$_2$=CH—CONH—), a vinyl thioether group, and the like.

Examples of the aryl group in the general formula (5) include a phenyl group, a naphthyl group, and the like.

Examples of the alkyl group in the general formula (5) include a methyl group, an ethyl group, and the like.

Examples of the alkoxy group in the general formula (5) include a methoxy group, an ethoxy group, and the like.

Examples of the aralkyl group in the general formula (5) include a benzyl group, a naphthylmethyl group, a phenethyl group, and the like.

Specific examples of the group represented by the general formula (5) include an α-chloroacryloyloxy group, a methacryloyl group, a methacryloyloxy group, an α-cyanoethylene group, an α-cyanoacryloyloxy group, an α-cyanophenylene group, a methacryloylamino group, and the like.

Examples of the substituents in the groups represented by the general formulas (4) and (5) include a halogen atom, a nitro group, a cyano group, an alkyl group such as a methyl group and an ethyl group, an alkoxy group such as a methoxy group and an ethoxy group, an aryloxy group such as a phenoxy group, an aryl group such as a phenyl group and a naphthyl group, an aralkyl group such as a benzyl group and a phenethyl group, and the like.

Note that among the above examples of radical polymerizable groups, an acryloyloxy group and a methacryloyloxy group are particularly suitable.

Preferable examples of the radical polymerizable compound having a triarylamine structure include compounds represented by the following general formulas (1-1) to (1-3).

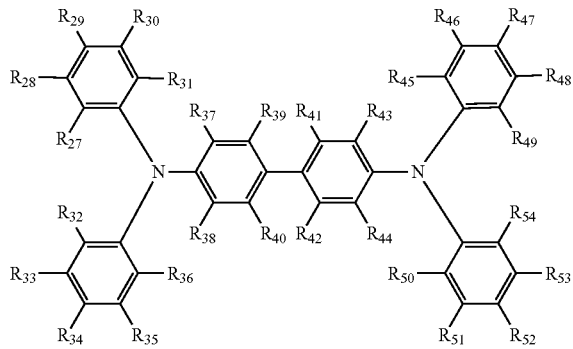
(1-1)

Note that in the above general formula (1-1), each of $R_{27}$ to $R_{54}$ independently represents a monovalent organic group, and at least one of $R_{27}$ to $R_{54}$ is a radical polymerizable group.

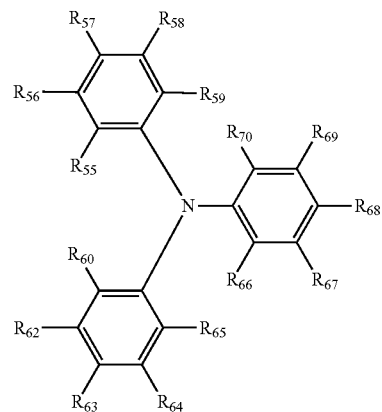
(1-2)

Note that in the above general formula (1-2), each of $R_{55}$ to $R_{70}$ independently represents a monovalent organic group, and at least one of $R_{55}$ to $R_{70}$ is a radical polymerizable group.

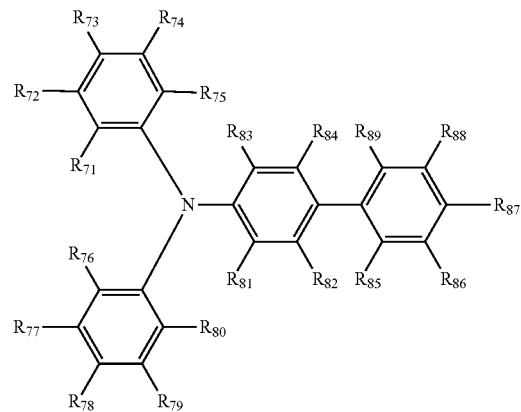
(1-3)

Note that in the above general formula (1-3), each of $R_{71}$ to $R_{89}$ independently represents a monovalent organic group, and at least one of $R_{71}$ to $R_{89}$ is a radical polymerizable group.

Note that possible examples of the monovalent organic groups and the radical polymerizable groups in the above general formulas (1-1) to (1-3) may be the same as the above-described examples for the general formula (1).

Note that the radical polymerizable compound having a triaryl amine structure is not limited to the above example compounds.

Other Radical Polymerizable Compound

The other radical polymerizable compound is a compound having a radical polymerizable group that is different from the radical polymerizable compound having a triarylamine structure.

Examples of the other radical polymerizable compound include a monofunctional radical polymerizable compound, a bifunctional radical polymerizable compound, a trifunctional or higher functional radical polymerizable compound, a functional monomer, and a radical polymerizable oligomer. Among the above examples, a bifunctional or higher functional radical polymerizable compound is particularly suitable.

Examples of the radical polymerizable group in the other radical polymerizable compound may be the same as the above-described examples of the radical polymerizable group in the radical polymerizable compound having a triarylamine structure. Among these examples, an acryloyloxy group and a methacryloyloxy group are particularly suitable.

Examples of the monofunctional radical polymerizable compound include
2-(2-ethoxyethoxy)ethyl acrylate, methoxypolyethylene glycol monoacrylate, methoxypolyethylene glycol monomethacrylate, phenoxypolyethylene glycol acrylate, 2-acryloyloxyethyl succinate, 2-ethylhexyl acrylate, 2-hydroxyethyl acrylate, 2-hydroxypropyl acrylate, tetrahydrofurfuryl acrylate, 2-ethylhexyl carbitol acrylate, 3-methoxybutyl acrylate, benzyl acrylate, cyclohexyl acrylate, isoamyl acrylate, isobutyl acrylate, methoxytriethylene glycol acrylate, phenoxytetraethyleneglycol acrylate, cetyl acrylate, isostearyl acrylate, stearyl acrylate, styrene, and the like. The above compounds may be used alone, or in any combination.

Examples of the bifunctional radical polymerizable compound include 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, neopentyl glycol diacrylate, and the like. The above compounds may be used alone, or in any combination.

Examples of the trifunctional or higher functional radical polymerizable compound include trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane triacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloyloxyethyl)isocyanurate, dipentaerythritol (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxytetraacrylate, EO-modified phosphate triacrylate,
2,2,5,5-tetrahydroxymethylcyclopentanone tetraacrylate, and the like. The above compounds may be used alone or in any combination.

Note that "EO-modified" stands for ethyleneoxy-modified, and "PO-modified" stands for propyleneoxy-modified.

Examples of the functional monomer include fluorine-substituted monomers such as
octafluoropentyl acrylate, 2-perfluorooctylethyl acrylate, 2-perfluorooctylethyl methacrylate, 2-perfluoro isononylethyl acrylate and the like; vinyl monomers having polysiloxane groups, such as acryloyl polydimethylsiloxane ethyl, methacryloyl polydimethylsiloxane ethyl, acryloyl polydimethyl siloxane propyl, acryloyl polydimethyl siloxane butyl, diacryloyl polydimethylsiloxane diethyl, in which the number of repeating siloxane units is between 20 to 70 as described in Japanese Examined Patent Publication No. H05-60503 and Japanese Examiner Patent Publication No. H06-45770; acrylates; methacrylates; and the like. The above monomers may be used alone or in any combination.

Examples of the radical polymerizable oligomer include an epoxy acrylate oligomer, a urethane acrylate oligomer, a polyester acrylate oligomer, and the like.

Note that in view of forming a crosslinked product, at least one of the radical polymerizable compound having a triarylamine structure and the other radical polymerizable compound preferably includes at least two radical polymerizable groups.

The content of the radical polymerizable compound having a triaryl amine structure in the oxidizing electrochromic composition is preferably greater than or equal to 10 mass % and less than or equal to 100 mass %, and more preferably greater than or equal to 30 mass % and less than or equal to 90 mass %. When the content of the radical polymerizable compound having a triaryl amine structure in the oxidizing electrochromic composition is greater than or equal to 10 mass %, the oxidizing electrochromic layer 21 would be able to adequately exhibit its electrochromic function, and the durability and coloration sensitivity of the electrochromic elements 10 and 20 may be improved.

Polymerization Initiator

The oxidizing electrochromic composition preferably further contains a polymerization initiator in order to efficiently promote the crosslinking reaction between the radical polymerizable compound having a triarylamine structure and the other radical polymerizable compound.

Examples of the polymerization initiator include a thermal polymerization initiator, a photopolymerization initiator, and the like. Among the above examples, a photopolymerization initiator may be suitable in view of achieving polymerization efficiency.

The thermal polymerization initiator is not particularly limited and may be suitably selected according to the purpose. Examples thereof include peroxide-based initiators, such as 2,5-dimethylhexane-2,5-dihydroperoxide, dicumyl peroxide, benzoyl peroxide, t-butyl cumyl peroxide, 2,5-dimethyl-2,5-di(peroxybenzoyl)hexyne-3, di-t-butylbenzoxide, t-butylhydrobenzoxide, cumene hydroperoxide, lauroyl peroxide, and the like; and azo-based initiators, such as azobisisobutyl nitrile, azobiscyclohexane carbonitrile, methyl azobisisobutyrate, azobisisobutylamidine hydrochloride, 4,4'-azobis-4-cyanovaleric acid, and the like. The above example initiators may be used alone or in any combination.

The photopolymerization initiator is not particularly limited and may be suitably selected according to the purpose. Examples thereof include acetophenone-based or ketal-based photopolymerization initiators, such as diethoxyacetophenone,
2,2-dimethoxy-1,2-diphenylethan-1-one, 1-hydroxy-cyclohexyl-phenyl-ketone, 4-(2-hydroxyethoxy)phenyl-(2-hydroxy-2-propyl)ketone, 2-benzyl-2-dimethylamino-1-(4-morpholinophenyl)butanone-1, 2-hydroxy-2-methyl-1-phenylpropane-1-one, 2-methyl-2-morpholino(4-methylthiophenyl)propane-1-one, 1-phenyl-1,2-propanedione-2-(o-ethoxycarbonyl)oxime, and the like; benzoin ether-based photopolymerization initiators, such as benzoin, benzoin methyl ether, benzoin ethyl ether, benzoin isobutyl ether, and benzoin isopropyl ether, and the like; benzophenone-based photopolymerization initiators, such as benzophenone,
4-hydroxybenzophenone, methyl o-benzoylbenzoate, 2-benzoylnaphthalene, 4-benzoylbiphenyl, 4-benzoylphenyl ether, acrylated benzophenone, 1,4-benzoylbenzene, and the like; thioxanthone-based photopolymerization initiators, such as
2-isopropylthioxanthone, 2-chlorothioxanthone, 2,4-dimethylthioxanthone, 2,4-diethylthioxanthone, 2,4-dichlorothioxanthone, and the like. Other examples of the photopolymerization initiators include ethylanthraquinone,
2,4,6-trimethylbenzoyldiphenylphosphine oxide,
2,4,6-trimethylbenzoylphenyl ethoxyphosphine oxide, bis (2,4,6-trimethylbenzoyl)phenylphosphine oxide, bis(2,4-dimethoxybenzoyl)-2,4,4-trimethylpentylphosphine oxide, methylphenylglyoxy ester, 9,10-phenanthrene, acridine compounds, triazine compounds, imidazole compounds, and the like. These example initiators may be used alone or in any combination.

Note that a photopolymerization accelerator may be used alone or in combination with a photopolymerization initiator.

Examples of the photopolymerization accelerator include triethanolamine, methyldiethanolamine, ethyl 4-dimethylaminobenzoate, isoamyl 4-dimethylaminobenzoate, (2-dimethylamino) ethyl benzoate, 4,4'-dimethylaminobenzophenone, and the like.

The mass ratio of the polymerization initiator with respect to the total amount of the radical polymerizable compound is preferably greater than or equal to 0.5 mass % and less than or equal to 40 mass %, and more preferably greater than or equal to 1 mass % and less than or equal to 20 mass %.

Other Components

The other components included in the oxidizing electrochromic composition are not particularly limited and may be suitably selected according to the purpose. Examples of other components that may be used include a solvent, a plasticizer, a leveling agent, a sensitizer, a dispersant, a surfactant, an antioxidant, a filler, and the like.

Method of Forming Oxidizing Electrochromic Layer

The method of forming the oxidizing electrochromic layer 21 preferably includes a coating step and a crosslinking step, and may further include other process steps as necessary.

Coating Step

The coating step involves applying a coating liquid containing an oxidizing electrochromic composition on the first transparent electrode 13.

The coating liquid may be diluted by a solvent as necessary upon being used.

The solvent is not particularly limited and may be suitably selected according to the purpose. Examples of the solvent that may be used include alcohol-based solvents such as methanol, ethanol, propanol, butanol, and the like; ketone-based solvents such as acetone, methyl ethyl ketone, methyl isobutyl ketone, cyclohexanone, and the like; ester-based solvents such as ethyl acetate, butyl acetate, and the like; ether-based solvents such as tetrahydrofuran, dioxane, propyl ether, and the like; halogen-based solvents such as dichloromethane, dichloroethane, trichloroethane, chlorobenzene, and the like; aromatic solvents such as benzene, toluene, xylene, and the like; cellosolve-based solvents such as methyl cellosolve, ethyl cellosolve, cellosolve acetate, and the like. These solvents may be used alone or in any combination.

Note that the dilution rate at which the coating liquid is to be diluted by the solvent can be appropriately selected in view of the solubility of the oxidizing electrochromic composition, the coating method, the thickness of the oxidizing electrochromic layer 21, and the like.

Example coating methods that may be used to apply the coating liquid include spin coating, casting, micro gravure coating, gravure coating, bar coating, roll coating, wire bar coating, dip coating, slit coating, capillary coating, spray coating, nozzle coating, gravure printing, screen printing, flexographic printing, offset printing, reverse printing, inkjet printing, and the like.

Crosslinking Step

The crosslinking step involves crosslinking the oxidizing electrochromic composition that has been coated on the first transparent electrode 13 through application of external energy.

Examples of the external energy include heat, light, radiation, and the like.

In the case of applying heat, air, gas or vapor of nitrogen or the like, various types of heating media, infrared rays, electromagnetic waves, or the like may be used to apply heat from the coated surface side or from the first substrate 11 side.

The heating temperature is not particularly limited and may be suitably selected according to the purpose, but for example, the heating temperature may preferably be greater than or equal to 60° C. and less than or equal to 170° C.

In the case of applying light, an ultraviolet light source such as a high pressure mercury lamp or a metal halide lamp mainly having an emission wavelength in the ultraviolet light (UV) range may be used, for example. However, a visible light source may also be used in accordance with the absorption wavelength of the radical polymerizable compound or the photopolymerization initiator, for example.

The light intensity of UV light irradiation is not particularly limited and may be suitably selected according to the purpose, but for example, the light intensity may preferably be greater than or equal to 5 mW/cm² and less than or equal to 15,000 mW/cm².

Other Oxidizing Electrochromic Layer

Example materials that may constitute other examples of the oxidizing electrochromic layer 21 include Prussian blue complex, nickel oxide, and the like. These materials may be used alone or in combination.

Example methods that may be used to form the other oxidizing electrochromic layer 21 include vacuum vapor deposition, sputtering, ion plating, and the like. In the case where the material constituting the other oxidizing electrochromic layer 21 can be coated, other example methods that may be used to form the oxidizing electrochromic layer 21 include spin coating, casting, micro gravure coating, gravure coating, bar coating, roll coating, wire bar coating, dip coating, slit coating, capillary coating, spray coating, nozzle coating, gravure printing, screen printing, offset printing, reverse printing, inkjet printing, and the like.

Reducing Electrochromic Layer

The average thickness of the reducing electrochromic layer 22 is preferably in the range from 0.2 μm to 5.0 μm. When the average thickness of the reducing electrochromic layer 22 is greater than or equal to 0.2 μm, the optical density at the time of coloration can be improved. When the average thickness of the reducing electrochromic layer 22 is less than or equal to 5.0 μm, uniformity and surface smoothness of the reducing electrochromic layer 22 may be improved.

The reducing electrochromic layer 22 may be a laminate of two or more layers, for example.

Also, the reducing electrochromic layer 22 may be formed on a part of the second transparent electrode 14, for example.

Examples of a reducing electrochromic material contained in the reducing electrochromic layer 22 include small molecule organic electrochromic materials such as azobenzene-based materials, anthraquinone-based materials, diarylethene-based materials, dihydroprene-based materials, dipyridine-based materials, styryl-based materials, styryl spiropyran-based materials, spirooxazine-based materials, spirothiopyran-based materials, thioindigo-based materials, tetrathiafulvalene-based materials, terephthalic acid-based materials, triphenylmethane-based materials, triphenylamine-based materials, naphthopyran-based materials, viologen-based materials, pyrazoline-based materials, phenazine-based materials, phenylenediamine-based materials, phenoxazine-based materials, phenothiazine-based materials, phthalocyanine-based materials, fluorane-based materials, fulgide-based materials, benzopyran-based materials, metallocene-based materials, and the like.

Among the above example materials, a compound having a quaternary pyridinium salt structure is suitable in view of its low coloration/decoloration potential and good color value.

As described below, the compound having a quaternary pyridinium salt structure is preferably used in combination with conductive metal oxide particles or semiconductive metal oxide particles. In this way, the optical density and the contrast ratio at the time of coloration can be increased.

The compound having a quaternary pyridinium salt structure is not particularly limited, but examples thereof include viologen-based compounds and dipyridine-based compounds.

Examples of the viologen-based compounds include the compounds described in Japanese Patent No. 3955641 and Japanese Unexamined Patent Publication No. 2007-171781, for example.

Examples of the dipyridine-based compounds include the compounds described in Japanese Unexamined Patent Publication No. 2007-171781 and Japanese Unexamined Patent Publication No. 2008-116718, for example.

Among the above compounds, a compound represented by the following general formula (6) is suitable in view of achieving good color values of coloration.

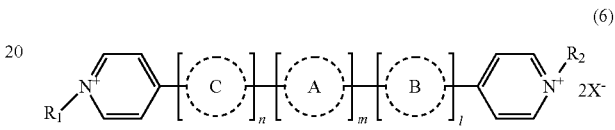

(6)

In the above general formula (6), each of $R_1$ and $R_2$ independently represents an alkyl group or an aryl group having 1 to 8 carbon atoms, each of which may have a substituent; at least one of $R_1$ and $R_2$ includes a substituent selected from the group consisting of —COOH, —PO(OH)$_2$, and —Si(OC$_k$H$_{2k+1}$)$_3$ (where k is an integer from 1 to 20); X⁻ represents a monovalent anion; each of A, B, and C independently represents an alkyl group, an aryl group or a heterocyclic group having 1 to 20 carbon atoms, each of which may have a substituent; each of n, m and l independently represent an integer 0, 1, or 2.

Note that X⁻ is not particularly limited as long as it is capable of stably forming a quaternary pyridinium salt structure and can be suitably selected according to the purpose. Examples of X⁻ include Br⁻, Cl⁻, ClO$_4$⁻, PF$_6$⁻, BF$_4$⁻, and the like.

Note that the compound represented by the general formula (6) is not limited to the above compound.

The reducing electrochromic material may be supported on conductive metal oxide particles or semiconductive metal oxide particles. In this way, the surface effect of the conductive metal oxide particles or the semiconductive metal oxide particles may be used to efficiently inject electrons into the reducing electrochromic material responsiveness may be improved as compared with conventional electrochromic elements. Further, by using the conductive metal oxide particles or the semiconductive metal oxide particles, the reducing electrochromic layer 22 can be transparent such that the coloration density of the reducing electrochromic material can be increased.

Note that in some embodiments, a plurality of types of reducing electrochromic materials may be supported on the conductive metal oxide particles or the semiconductive metal oxide particles, for example.

Examples of the metal oxide constituting the conductive metal oxide particle or the semiconductive metal oxide particle includes titanium oxide, zinc oxide, tin oxide, zirconium oxide, cerium oxide, yttrium oxide, boron oxide, magnesium oxide, titanic acid Strontium, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, calcium phosphate, a metal oxide containing aluminosilicate as a main component, and the like. These metal oxides may be used alone or in any combination.

Among the above metal oxides, titanium oxide, zinc oxide, tin oxide, zirconium oxide, iron oxide, magnesium oxide, indium oxide, and tungsten oxide are particularly suitably in view of their electrical properties such as electric conductivity and physical properties such as optical characteristics.

The conductive metal oxide particles or the semiconductive metal oxide particles preferably have a large specific surface area so as to efficiently support the reducing electrochromic material. For example, when aggregates of nanoparticles are used as the conductive metal oxide particles or the semiconductive metal oxide particles, the reducing electrochromic material may be efficiently supported, and a desirable coloration/decoloration display contrast ratio may be achieved.

Method of Forming Reducing Electrochromic Layer

Example methods that may be used to form the reducing electrochromic layer 22 include vacuum vapor deposition, sputtering, ion plating, and the like. In the case where the material constituting the reducing electrochromic layer 22 can be coated, example methods that may be used to form the reducing electrochromic layer 22 include spin coating, casting, micro gravure coating, gravure coating, bar coating, roll coating, wire bar coating, dip coating, slit coating, capillary coating, spray coating, nozzle coating, gravure printing, screen printing, flexographic printing, reverse printing, inkjet printing, and the like.

Among these methods, a printing method is preferably used in view of productivity.

An example method of supporting the reducing electrochromic material on the conductive metal oxide particles or the semiconductive metal oxide particles may involve sintering the conductive metal oxide particles or semiconductive metal oxide particles having a particle size of about 5 nm to 50 nm and then causing adsorption of the compound represented by the general formula (6) to the sintered particles.

Electrolyte Layer

The average thickness of the electrolyte layer 23 is preferably in the range from 100 nm to 100 μm.

The electrolyte layer 23 may be in a liquid state or a solid state.

The liquid electrolyte layer 23 is not particularly limited, but an electrolyte solution, an ionic liquid, or the like may be used, for example.

Examples of the electrolyte contained in the electrolyte solution include inorganic ion salts such as alkali metal salts and alkaline earth metal salts, quaternary ammonium salts, and supporting electrolytes of acids and alkalis.

Specific examples of the electrolyte contained in the electrolyte solution include $LiClO_4$, $LiBF_4$, $LiAsF_6$, $LiPF_6$, $LiCF_3SO_3$, $LiCF_3COO$, $KCl$, $NaClO_3$, $NaCl$, $NaBF_4$, $NaSCN$, $KBF_4$, $Mg(ClO_4)_2$, $Mg(BF_4)_2$, and the like.

When an electrolyte is used alone, the electrolyte may be in a liquid state or a solid state.

When an ionic liquid is used as the electrolyte layer 23, an ionic liquid containing organic ions is preferably used because it can exhibit a liquid state in a wide range of temperatures including room temperature.

Examples of the cation component of the ionic liquid containing organic ions include imidazole derivatives such as N,N-dimethyl imidazole salt, N,N-methylethyl imidazole salt, and N,N-methylpropyl imidazole salt; pyridinium derivatives such as N,N-dimethyl pyridinium salt, and N,N-methylpropyl pyridinium salt; aliphatic quaternary ammonium-based compounds, such as trimethylpropyl ammonium salt, trimethylhexyl ammonium salt, triethylhexyl ammonium salt, and the like.

The anion component of the ionic liquid containing organic ions is preferably an anion containing fluorine in view of its stability in the atmosphere.

Examples of fluorine-containing anions include $BF_4^-$, $CF_3SO_3^-$, $PF_4^-$, $(CF_3SO_2)_2N^-$, and the like.

Note that the ionic liquid may include any combination of the above cations and anions.

Examples of the electrolyte layer 23 in a solid state include electrolytes in the form of a gel, a crosslinked polymer, a liquid crystal dispersion, and the like. By forming the electrolyte layer 23 in a gel state or a solid state, the strength and reliability of the electrochromic element 20 may be improved.

When forming the solid electrolyte layer 23, the electrolyte is preferably held in a resin. In this way, the ionic conductivity and strength of the electrolyte layer 23 can be increased.

The resin used in the solid electrolyte layer 23 is preferably a photocurable resin. In this way, the electrochromic element 20 can be manufactured in a short time under a low temperature condition.

For example, the solid electrolyte layer 23 may be formed by directly dissolving an ionic liquid in any of a photocurable monomer, a photocurable oligomer, and a liquid crystal material and then photocuring it. Note that when the solubility of the ionic liquid is low, the ionic liquid may be dissolved in a solvent and then mixed with any one of the photocurable monomer, photocurable oligomer, and liquid crystal material, for example.

Examples of the solvent include propylene carbonate, acetonitrile, y-butyrolactone, ethylene carbonate, sulfolane, dioxolane, tetrahydrofuran, 2-methyltetrahydrofuran, dimethylsulfoxide, 1,2-dimethoxyethane, 1,2-ethoxymethoxyethane, polyethylene glycol, alcohols, and the like. These solvents may be used alone or in any combination.

Coloration Layer

The coloration layer 15 in the electrochromic element 20 is composed of the oxidizing electrochromic layer 21, the reducing electrochromic layer 22, and the electrolyte layer 23.

On the other hand, the coloration layer 15 in the electrochromic element 10 is a single layer, and may be substantially the same as the coloration layer 15 in the electrochromic element 20 except that it includes an electrochromic material and an electrolyte.

The coloration layer 15 in the electrochromic element 10 includes an oxidizing electrochromic material and/or a reducing electrochromic material.

Other Members

The electrochromic elements 10 and 20 may also include other members.

Other members that may be included in the electrochromic elements 10 and 20 are not particularly limited and can be suitably selected according to the purpose. Examples thereof include an insulating porous layer, a sealing material, and the like.

Insulating Porous Layer

An insulating porous layer has the functions of separating the first transparent electrode 13 and the second transparent electrode 14 so that they are electrically insulated from each other and holding the electrolyte.

The average thickness of the insulating porous layer is preferably in the range from 0.5 μm to 3 μm.

The material constituting the insulating porous layer is not particularly limited as long as it is transparent and porous. Example materials that may be suitably used include organic and inorganic materials having high insulation and durability and excellent film forming properties, and composites thereof.

The insulating porous layer is preferably arranged between the oxidizing electrochromic layer 21 and the reducing electrochromic layer 22.

Example methods that may be used to form the insulating porous layer include a sintering method, an extraction method, and the like.

In the sintering method, polymer particles or inorganic particles are added to a binder and partially fused to form fine pores between the particles.

In the extraction method, a layer composed of a substance that is soluble in a solvent and a binder that is not soluble in the solvent is formed, and the substance is dissolved by the solvent to form fine pores.

Also, other example methods that may be used to form the insulating porous layer include a foaming method that involves causing foaming of a polymer through heating, degassing or the like; a phase inversion method the involves causing phase separation of a polymer mixture using a good solvent and a poor solvent; an irradiation method that involves irradiating various types of radiation to form fine pores, and the like.

Specific examples of the insulating porous layer include a film containing metal oxide particles (e.g., $SiO_2$ particles, $Al_2O_3$ particles) and a binder, a porous organic film (e.g., a porous polyurethane film, a porous polyethylene film), a porous inorganic insulating film, and the like. Among the above examples, a film containing $SiO_2$ particles and a binder may be suitably used in view of its excellent insulating properties, relatively low refractive index, and low cost.

Example film forming methods that may be used to form the insulating porous layer include vacuum vapor deposition, sputtering, ion plating, and the like. In the case where the material constituting the insulating porous layer can be applied as a coating, example methods that may be used to form the insulating porous layer include spin coating, casting, micro gravure coating, gravure coating, bar coating, roll coating, wire bar coating, dip coating, slit coating, capillary coating, spray coating, nozzle coating, gravure printing, screen printing, flexographic printing, offset printing, reverse printing, inkjet printing, and other various printing methods.

Sealing Material

A sealing material is preferably used to seal the side faces of the layers included in the electrochromic elements 10 and 20. In this way, leakage of the electrolyte may be prevented, and intrusion of undesired substances, such as moisture and oxygen in the atmosphere, that are unnecessary for the stable operation of the electrochromic elements 10 and 20 may be prevented, for example.

The material constituting the sealing material is not particularly limited, but for example, an ultraviolet curable resin or a thermosetting resin may be used.

Specific examples of the material constituting the sealing material include acrylic resins, urethane resins, epoxy resins, and the like.

Application of Electrochromic Element

In the following, example applications of the electrochromic element 20 will be described.

The electrochromic element 20 may be used in a lens unit.

The lens unit may be used in an image capturing apparatus. In this case, the lens unit preferably has a lens configuration in which the surface of the first substrate 11 that is not facing the second substrate 12 and the surface of the second substrate 12 that is not facing the first substrate 11 are arranged into convex surfaces.

The image capturing apparatus may be installed in a mobile terminal, a digital camera, an automobile, and other moving objects, for example.

Further, the electrochromic element 20 may be applied to an electronic dimming window, electronic dimming eyeglasses, and the like.

Figure 11:
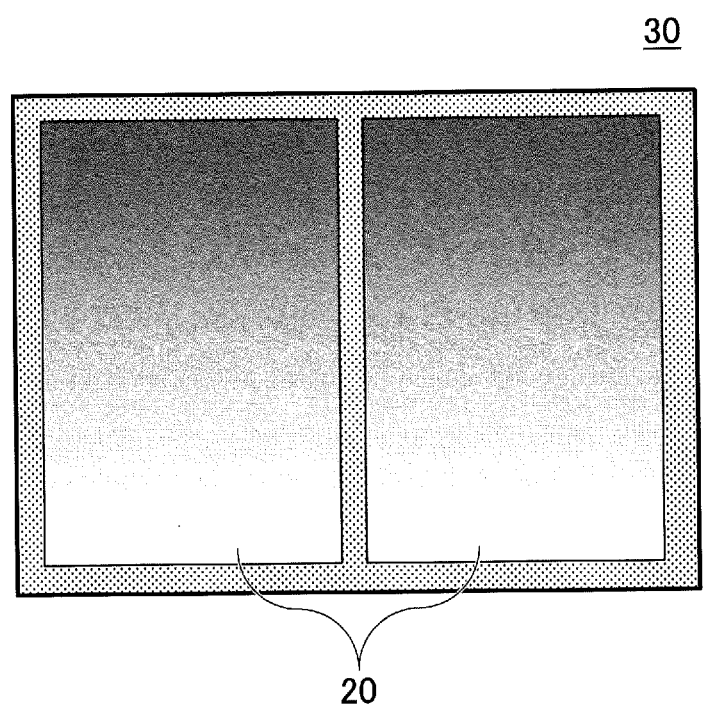
FIG. 11 is a diagram illustrating an electronic dimming window according to a third embodiment of the present invention.

FIG. 11 illustrates an electronic dimming window according to a third embodiment of the present invention.

While conventional electronic dimming windows exhibit uniform coloration, the electronic dimming window 30 according to the present embodiment includes the electrochromic element 20 and is therefore capable of exhibiting gradation coloration. In this way, the electronic dimming window 30 may have improved design. In the example illustrated in FIG. 11, concentration gradients of the electrochromic materials (black portions in FIG. 11) included in the oxidizing electrochromic layer and the reducing electrochromic layer of the electrochromic element 20 are formed along one axis direction (vertical direction in FIG. 11) that is parallel to the surface of the first substrate (or the surface of the second substrate).

Note that by using resin films as the first substrate 11 and the second substrate 12, the electrochromic element 20 may be arranged into an electronic dimming film.

Figure 12A:
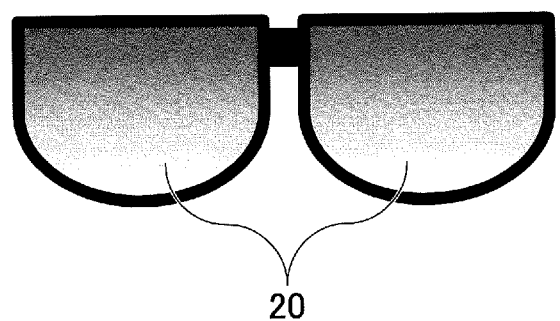
FIGS. 12A and 12B are diagrams illustrating example electronic dimming eyeglasses according to a fourth embodiment of the present invention.
Figure 12B:
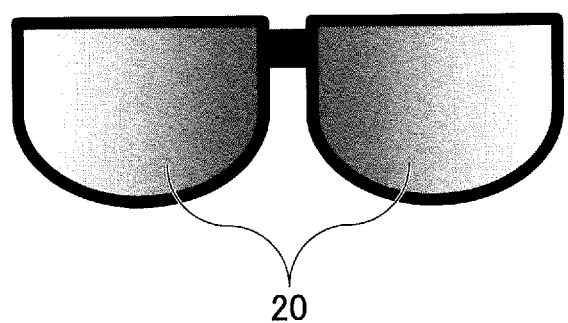

FIGS. 12A and 12B illustrate examples of electronic dimming eyeglasses according to a fourth embodiment of the present invention.

While conventional electronic dimming eyeglasses exhibit uniform coloration, the electronic dimming eyeglasses 40A and 40B (also collectively referred to as "electronic dimming eyeglasses 40") according to the present embodiment include the electrochromic element 20 and are therefore capable of exhibiting gradation coloration. In this way, the electronic dimming eyeglasses 40 may have improved design. Note that the electrochromic elements 20 in the examples illustrated in FIGS. 12A and 12B have concentration gradients of the electrochromic materials (black portions in FIGS. 12A and 12B) included in the oxidizing electrochromic layer and the reducing electrochromic layer formed along one axis direction parallel to the surface of the first substrate (or the surface of the second substrate). Note that the one axis direction along which the concentration gradient is formed in the electronic dimming eyeglasses 40A and 40B are respectively the longitudinal direction and the lateral direction in FIGS. 12A and 12B.

Note that although applications of the electrochromic element 20 are described above as examples, the electrochromic element 10 may be used in similar applications.

EXAMPLES

In the following, examples of the present invention will be described. Note, however, that the present invention is not limited to the following examples. Also, in the following description of examples, the term "parts" refers to parts by mass.

Example 1

Preparation of First Substrate

An ITO glass substrate (40 mm×40 mm×0.7 mm) made of a glass substrate having an ITO film with a thickness of about 100 nm formed thereon as the first transparent electrode 13 was prepared as the first substrate 11.

Formation of Oxidizing Electrochromic Layer

A coating liquid was prepared by mixing together polyethylene glycol diacrylate (PEG 400 DA, manufactured by Nippon Kayaku Co., Ltd.), a photopolymerization initiator (IRGACURE 184, manufactured by BASF AG), an oxidizing electrochromic material represented by the following chemical formula, and 2-butanone at a mass ratio of 57:3:140:800.

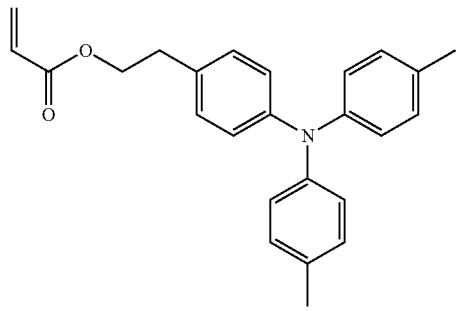 [SMILES: C=CC(=O)OCCc1ccc(N(c2ccc(C)cc2)c2ccc(C)cc2)cc1]

Then, spin coating was performed to coat the ITO film of ITO glass substrate with the coating liquid. Then, the coated film was cured by irradiating the coated film with UV irradiation under a nitrogen atmosphere, via a quartz substrate having a predetermined Cr pattern formed thereon, and in this way, an oxidizing electrochromic layer 21 with a thickness of 1.1 μm having a concentration gradient of the oxidizing electrochromic material formed therein (see FIG. 3) was formed on the first transparent electrode 13.

Note that the area gradation method was used to form the concentration gradient of the oxidizing electrochromic material.

Preparation of Second Substrate

An ITO glass substrate (40 mm×40 mm×0.7 mm) made of a glass substrate having an ITO film with a thickness of about 100 nm formed there on as the second transparent electrode 14 was prepared as the second substrate 12.

Formation of Reducing Electrochromic Layer

A paste was prepared by bead milling 3 g of titanium oxide (ST-21, manufactured by Ishihara Sangyo Kaisha, Ltd.), 0.2 g of acetylacetone, 0.3 g of polyoxyethylene octylphenyl ether (manufactured by Wako Pure Chemical Industries, Ltd.) as a surfactant, 5.5 g of water, and 1.0 g of ethanol for 12 hours, and thereafter adding 1.2 g of polyethylene glycol #20,000 (manufactured by Nacalai Tesque, Ltd.).

Then, the paste was applied onto the ITO film of the ITO glass substrate to a thickness of 2 pm by screen printing, dried at room temperature, and then baked at 250° C. for 30 minutes in air to sinter the titanium oxide particles.

Note that a pattern similar to that formed on the oxidizing electrochromic layer 21 is formed on a printing plate used in the above screen printing.

Then, spin coating was performed to apply a 1-mass % 2,2,3,3-tetrafluoropropanol (hereinafter referred to as "TFP) solution of a reducing electrochromic material represented by the following chemical formula on the titanium oxide particles, after which an annealing process was performed at 120° C. for 10 minutes to form a reducing electrochromicn layer 22 on the second transparent electrode 14.

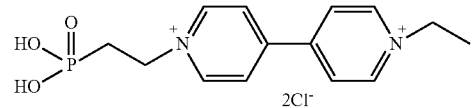

Formation of Electrolyte Layer

An electrolyte layer composition was prepared by mixing together 5 parts of IRGACURE 184 (manufactured by BASF Japan), 100 parts of PEG 400 DA (manufactured by Nippon Kayaku Co., Ltd.) and 50 parts of 1-ethyl-3-methylimidazolium tetracyanoborate (manufactured by Merck KGaA), and thereafter adding and dispersing 0.2 parts of Micropearl GS-230 (manufactured by Sekisui Chemical Co., Ltd.) having a volume average particle size of 30 μm, as a resin beads spacer, in the mixture.

Then, 50 μL of the electrolyte layer composition was supplied onto the oxidizing electrochromic layer 21 formed on the first substrate 11, and the second substrate 12 was adhered thereon so that the reducing electrochromic layer 22 formed on the second substrate 12 faced the electrolyte layer composition. Note that the end portions of the first substrate 11 and the second substrate 12 were shifted from each other by 5 mm in order to secure a contact portion for driving. Then, using a UV irradiation apparatus, SPOT CURE (manufactured by Ushio Inc.), under a light intensity condition of 10 mW/cm$^2$, UV light with a wavelength of 250 nm was irradiated for 60 seconds to cure the electrolyte layer composition to fabricate the electrochromic element 20.

Note that the electrolyte layer 23 was formed in a glove box substituted with argon.

Optical Characteristics Evaluation

Optical characteristics of the electrochromic element 20 were evaluated by imaging transmitted light of white light sources of the electrochromic element 20 using a two-dimensional color luminance meter, CA-2000 (manufactured by Konica Minolta, Inc.). Specifically, a voltage of 1.5 V was applied between the first transparent electrode 13 and the second transparent electrode 14 of the electrochromic element 20 for about 30 seconds to cause coloration of the coloration layer 15, and the luminance distribution was measured.

Figure 13:
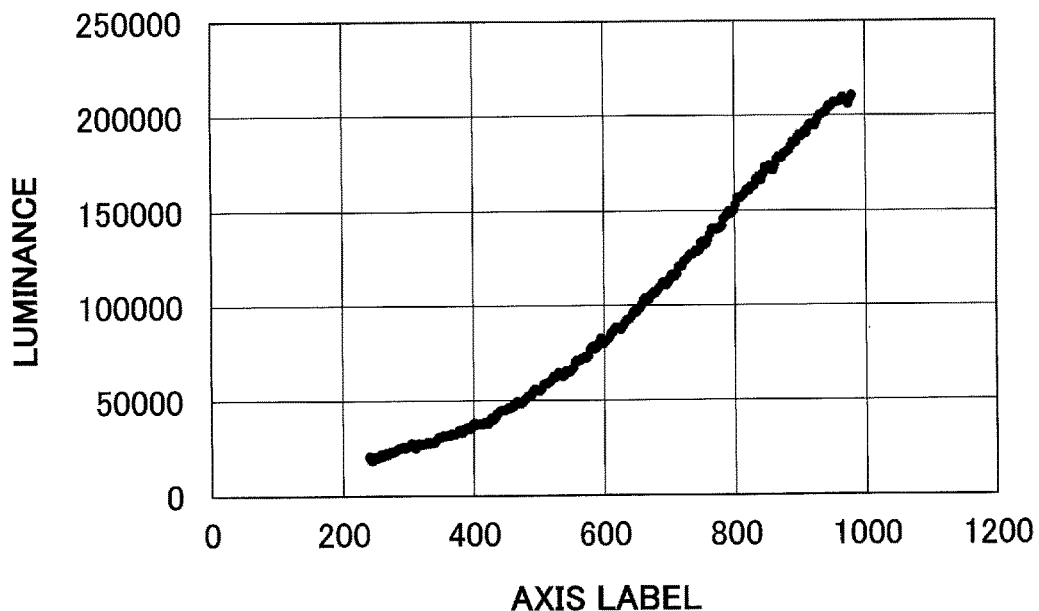
FIG. 13 is a graph indicating optical characteristics of a region of an electrochromic element of Example 1 where a concentration gradient of the electrochromic material is formed.

FIG. 13 is a graph indicating the optical characteristics evaluation results obtained from a region of the electrochromic element of Example 1 where the concentration gradient of the electrochromic material is formed. Note that the horizontal axis in FIG. 13 represents relative positions in the direction of line A-A' in FIG. 3.

As can be appreciated from FIG. 13, in the region of the electrochromic element of Example 1 where the concentration of the electrochromic material is formed, the luminance changes uniformly in the direction of line A-A' of FIG. 3 from one end to the other end. Note that the white light transmittance of the electrochromic element of Example 1 was in the range from about 8% to about 80%.

Also, when a short circuit between the first transparent electrode and the second transparent electrode of the electrochromic element of Example 1 was established by an external circuit, prompt decolorization of the coloration layer occurred. Note that the white light transmittance of the electrochromic element of Example 1 at this time was uniformly at about 80%.

Comparative Example 1

An electrochromic element was prepared in the same manner as in Example 1 except that no concentration gradient of the electrochromic material was formed in the oxidizing electrochromic layer 21 and the reducing electrochromic layer 22, and the optical characteristics of the resulting electrochromic element were evaluated.

Figure 14:
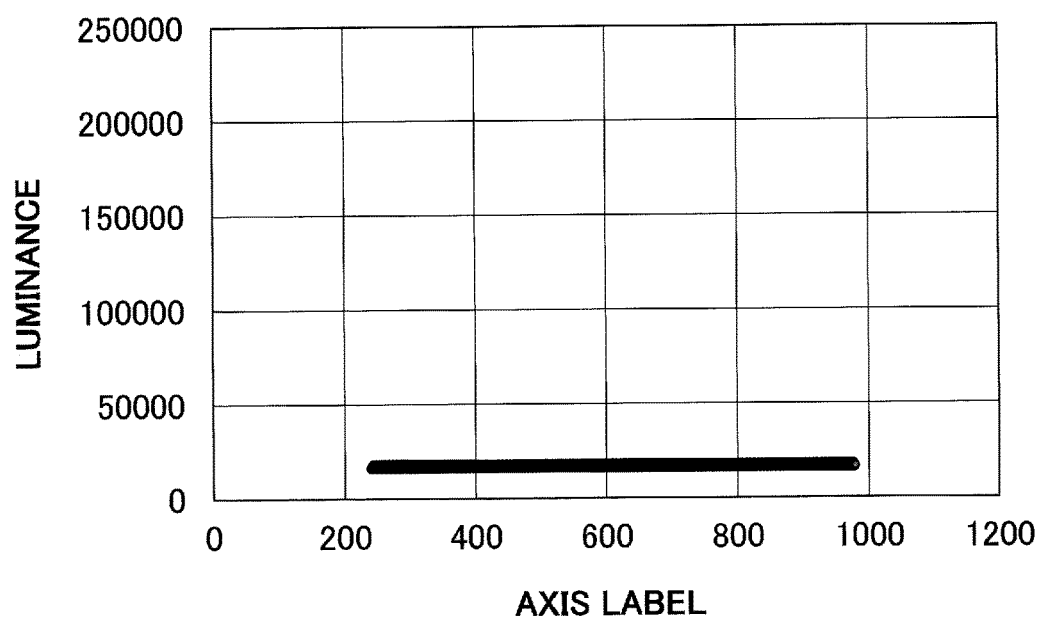
FIG. 14 is a graph indicating optical characteristics of an electrochromic element of Comparative Example 1.

FIG. 14 is a graph indicating the optical characteristics evaluation results obtained of the electrochromic element of Comparative Example 1

As can be appreciated from FIG. 14, the luminance of the electrochromic element of Comparative Example 1 is uniform. Note that the white light transmittance of the electrochromic element of Comparative Example 1 was uniformly at about 8%.

Also, when a short circuit between the first transparent electrode and the second transparent electrode of the electrochromic element was established by an external circuit, prompt decolorization of the coloration layer occurred. Note that the white light transmittance of the electrochromic element of Comparative Example 1 at this time was uniformly at about 80%.

Example 2

An electrochromic element was prepared in the same manner as in Example 1 except that a concentration gradient as shown in FIG. 5 was formed in the oxidizing electrochromic layer 21 and the reducing electrochromic layer 22, and the optical characteristics of the resulting electrochromic element were evaluated.

Figure 15:
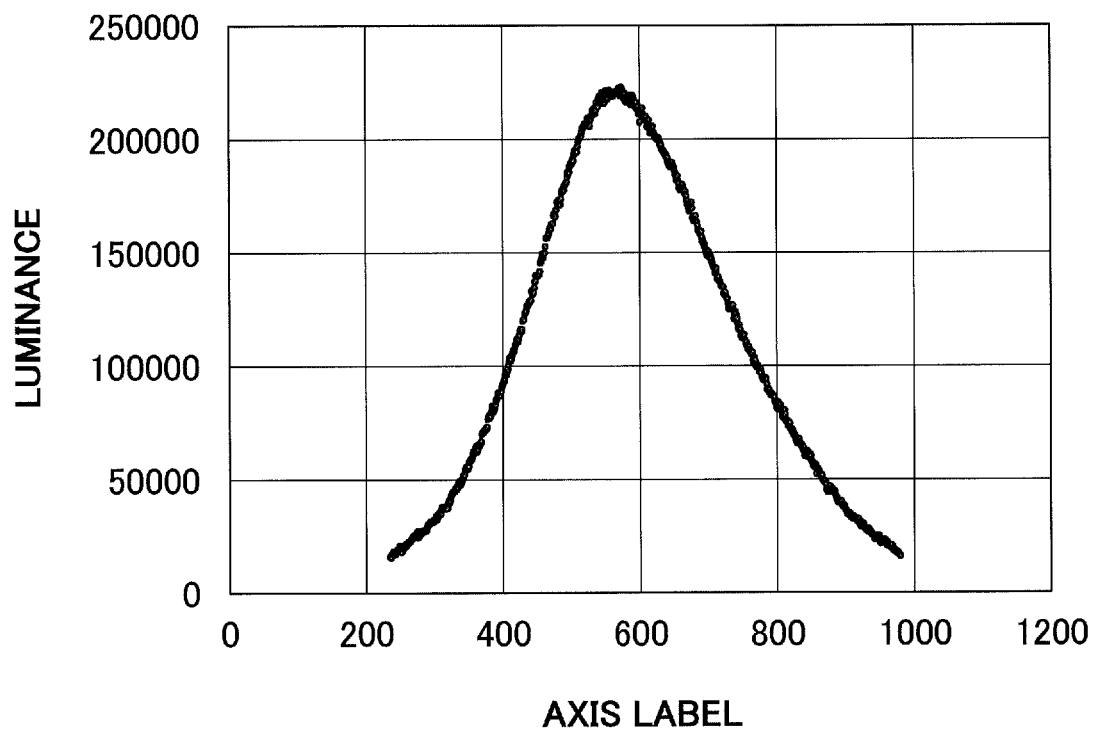
FIG. 15 is a graph indicating optical characteristics of an electrochromic element of Example 2.

FIG. 15 is a graph indicating the optical characteristics evaluation results of the electrochromic element of Example 2. Note that the horizontal axis in FIG. 15 represents relative positions in the direction of line A-A' in FIG. 5.

As can be appreciated from FIG. 15, the luminance of the electrochromic element of Example 2 is highest at the center and uniformly decreases from the center toward the opposite ends of the A-A' direction of FIG. 5. Note that the white light transmittance of the electrochromic element of Example 2 was about 80% at the center and about 8% at both ends.

Also, when a short circuit between the first transparent electrode and the second transparent electrode of the electrochromic element of Example 2 was established by an external circuit, prompt decolorization of the coloration layer occurred. The white light transmittance of the electrochromic element of Example 2 at this time was uniformly at about 80%.

Example 3

An electrochromic lens was fabricated in the same manner as in Example 1 except that plano-convex lenses were used as the first substrate 11 and the second substrate 12. Note that a first transparent electrode and an oxidizing electrochromic layer were formed on the planar side of one plano-convex lens, and a second transparent electrode and a reducing electrochromic layer were formed on the planar side of the other plano-convex lens.

Optical Characteristics Evaluation

The external appearance of the electrochromic lens was visually inspected, and the optical characteristics of the electrochromic lens were evaluated. Specifically, a voltage of 1.5 V was applied between the first transparent electrode and the second transparent electrode of the electrochromic lens for about 30 seconds to cause coloration of the coloration layer. As a result, it was confirmed that in the region of the electrochromic lens where the concentration gradient of the electrochromic material is formed, the light transmittance uniformly changes from one end toward the center.

Example 4

The electrochromic element of Example 1 was placed in a drive frame equipped with a battery, a signal generating circuit, a drive switch, and wiring to produce electronic dimming eyeglasses.

Optical Characteristics Evaluation

The external appearance of the electronic dimming eyeglasses was visually inspected, and the optical characteristics of the electronic dimming eyeglasses were evaluated. Specifically, the drive switch of the electronic dimming eyeglasses was switched on, and a voltage of 1.5 V was applied between the first transparent electrode and the second transparent electrode for about 30 seconds to cause coloration of the coloration layer. As a result, it was confirmed that in the region of the electronic dimming eyeglasses where the concentration gradient of the electrochromic material was formed, the light transmittance uniformly changed from one end toward the center.

Although the present invention has been described above with reference to illustrative embodiments and examples, the present invention is not limited to these embodiments and examples, and numerous variations and modifications may be made without departing from the scope of the present invention.

What is claimed is:

1. An electrochromic element comprising:
 a first substrate and a second substrate that are arranged to oppose each other;
 a first transparent electrode that is formed on a surface of the first substrate facing the second substrate;
 a second transparent electrode that is formed on a surface of the second substrate facing the first substrate; and a coloration layer that is arranged between the first transparent electrode and the second transparent electrode;

wherein the coloration layer includes more than one electrochromic materials and an electrolyte; and wherein a concentration gradient of the electrochromic material is formed in at least a part of the coloration layer, wherein the coloration layer includes an oxidizing electrochromic material-containing layer that is formed to be in contact with the first transparent electrode and a reducing electrochromic material-containing layer that is formed to be in contact with the second transparent electrode, the concentration gradient of the electrochromic material is formed in at least a part of the oxidizing electrochromic material-containing layer, and the concentration gradient of the electrochromic material is formed in at least a part of the reducing electrochromic material-containing layer, wherein a concentration of the electrochromic material is uniform in a semicircle region of the oxidizing electrochromic material-containing layer, and the concentration gradient of the electrochromic material is formed in other semicircle region of the oxidizing electrochromic material-containing layer. and wherein a concentration of the electrochromic material is uniform in a semicircle region of the reducing electrochromic material-containing layer, and the concentration gradient of the electrochromic material is formed in other semicircle region of the reducing electrochromic material-containing layer.

2. The electrochromic element according to claim 1, wherein
the oxidizing electrochromic material-containing layer includes a crosslinked product of a composition including a radical polymerizable compound having a triarylamine structure and another radical polymerizable compound that is different from the radical polymerizable compound having the triarylamine structure.

3. The electrochromic element according to claim 1, wherein
the reducing electrochromic material-containing layer includes a compound having a quaternary pyridinium salt structure and conductive metal oxide particles or semiconductive metal oxide particles.

4. The electrochromic element according, to claim 1, wherein the electrochromic material is arranged into a concentrically uniform concentration gradient.

5. The electrochrornic element according to claim 1, wherein a surface of the first substrate not facing the second substrate and a surface of the second substrate not facing the first substrate are arranged into convex lens surfaces.

6. A lens unit comprising:
the electrochromic element according to claim 1.

7. An image capturing apparatus comprising:
the lens unit according to claim 6.

8. Electronic dimming eyeglasses comprising:
the electrochroinic element according to claim 1.

9. An electronic dimming window comprising:
the electrochromic element according to claim 1.

10. The electrochrornic element according to claim 1, wherein the coloration layer has a circle shape that has the concentration gradient of the electrochrornic material so that sections of the coloration layer cut along a line perpendicular to a predetermined diameter of the coloration layer have the concentration gradient of the electrochrornic material that becomes higher from one end to the other end along the predetermined diameter of the coloration layer.

11. The electrochromic element according to claim 1, wherein the coloration layer has a circle shape that is divided into a first half circle and a second half circle, and
the first half circle has the concentration gradient of the electrochromic material so that sections of the first half circle cut along a line perpendicular to a predetermined diameter of the circle shape have the concentration gradient of the electrochromic material that becomes higher from one end to a center of the circle shape along the predetermined diameter of the circle shape and the second half circle has a consistent concentration of the electrochromic material along the predetermined diameter.

12. The electrochromic element according to claim 1, wherein the electrolyte forms an electrolyte layer between the oxidizing electrochromic material-containing layer and the reducing electrochromic material-containing layer and an entirety of the electrolyte layer has a same concentration of one of alkali metal salt, alkaline earth metal salt, quaternary ammonium salt, supporting electrolyte of acids and alkalis, and an ionic liquid containing organic ions.

13. The electrochromic element according to claim 12, wherein the electrolyte layer includes at least one of $LiClO_4$; $LiBF_4$; $LiAsF_6$; $LiPF_6$; $LiCF_3SO_3$; $LiCF_3COO$; $KCl$; $NaClO_3$; $NaCl$; $NaBF_4$; $NaSCN$; $KBF_4$; $Mg(ClO_4)_2$; $Mg(BF_4)_2$; imidazole derivatives such N,N-dimethyl imidazole salt, N,N-methylethyl imidazole salt, and N,N-methylpropyl imidazole salt; pyridinium derivatives such as N,N-dimethyl pyridinium salt, and N,N-methylpropyl pyridinium salt; and aliphatic quaternary ammonium-based compounds, such as trimethylpropyl ammonium salt, trimethylhexyl ammonium salt, and triethylhexyl ammonium salt.

14. The electrochromic element according to claim 1, wherein the concentration gradient of the electrochromic material is formed by an area gradation method or a density gradation method.

15. The electrochromic element according to claim 1, wherein the coloration layer forms a light transmittance distribution according to the concentration gradient of the electrochromic material when a predetermined voltage is applied between the first transparent electrode and the second transparent electrode.

16. The electrochromic element according to claim 1, wherein a predetermined coloration voltage is uniformly applied between the first transparent electrode and the second transparent electrode.

* * * * *